(12) United States Patent
Huang

(10) Patent No.: US 8,413,768 B2
(45) Date of Patent: Apr. 9, 2013

(54) ANTI-LOCK BRAKE STRUCTURE

(76) Inventor: Tan-Cheng Huang, Taichung (TW)

( * ) Notice: Subject to any disclaimer, the term of this patent is extended or adjusted under 35 U.S.C. 154(b) by 0 days.

(21) Appl. No.: 12/812,749

(22) PCT Filed: Apr. 7, 2009

(86) PCT No.: PCT/CN2009/071180
§ 371 (c)(1),
(2), (4) Date: Jul. 13, 2010

(87) PCT Pub. No.: WO2009/124494
PCT Pub. Date: Oct. 15, 2009

(65) Prior Publication Data
US 2011/0042175 A1    Feb. 24, 2011

(30) Foreign Application Priority Data

Apr. 8, 2008  (CN) .......................... 2008 1 0052663

(51) Int. Cl.
*B62L 3/00*    (2006.01)

(52) U.S. Cl. ..................................... 188/24.22; 188/72.7

(58) Field of Classification Search ............... 188/24.11, 188/24.14, 24.22, 70 R, 70 B, 72.1, 72.2, 188/72.7, 85; 384/58, 449, 504
See application file for complete search history.

(56) References Cited

U.S. PATENT DOCUMENTS

| 4,055,235 | A | * | 10/1977 | Tanaka et al. | 188/24.14 |
| 4,606,657 | A | * | 8/1986 | Tanaka | 384/492 |
| 5,431,257 | A | * | 7/1995 | Rocca et al. | 188/24.21 |
| 5,503,253 | A | * | 4/1996 | Li | 188/24.12 |
| 6,786,308 | B1 | * | 9/2004 | Huang | 188/24.12 |
| 2004/0182655 | A1 | * | 9/2004 | Huang | 188/24.22 |
| 2005/0039989 | A1 | * | 2/2005 | Huang | 188/26 |
| 2006/0042888 | A1 | * | 3/2006 | Huang | 188/24.22 |
| 2007/0215415 | A1 | * | 9/2007 | Sandro et al. | 188/24.14 |
| 2008/0245622 | A1 | * | 10/2008 | Cao et al. | 188/72.2 |

FOREIGN PATENT DOCUMENTS

WO    WO 2007023051 A1 * 3/2007

* cited by examiner

*Primary Examiner* — Bradley King
*Assistant Examiner* — Nicholas J Lane

(57) ABSTRACT

An anti-lock brake structure includes a brake base having a curved guiding portion formed thereon and a slidable holder. The slidable holder has a curved guiding groove defined therein for receiving the brake base. Two anti-lock inclined surfaces are positioned between the curved guiding portion and the curved guiding groove. Each anti-lock surface has a shallow section and a deeper section. Two wheel sets are disposed between the curved guiding portion and the curved guiding groove. A seat member connected to the slidable holder and receives an elastomer. A brake shoe is connected to the slidable holder. Each wheel set rolls and reciprocates between the shallow section and the deeper section of the corresponding anti-lock inclined surface, such that the brake shoe is tightly or loosely rubbed against a wheel rim of the vehicle to provide an anti-lock brake effect.

7 Claims, 26 Drawing Sheets

ANTI-LOCK BRAKE STRUCTURE

BACKGROUND OF THE INVENTION

1. Field of the Invention

The present invention relates to an anti-lock brake structure, particularly to a brake assembly having a slidable holder slidably receiving a brake base and connected to a brake shoe. Two wheel sets and two anti-lock inclined surfaces are disposed between the brake base and the slidable holder. An elastomer is received in a seat member which is connected to the slidable holder. When braking, the slidable holder relative to the brake base by an inertial force of a wheel rim and a biasing force of the elastomer. Each wheel set rolls and reciprocates between the shallow section and the deeper section of the corresponding anti-lock inclined surface of the slidable holder. The brake shoe is tightly or loosely rubbed against the wheel rim to provide an anti-lock brake effect.

2. Description of Related Art

Applicant has applied several Taiwan patents which includes Taiwan Patent Certification No. 241967, 261564, and 229046 all disclose an anti-lock brake structure. Taiwan Patent Application No. 96101658 and 96101659 disclose a positioning structure of an elastomer for an anti-lock brake structure. However, the five references cited above have some disadvantages which are as follows:

First, the cited references all disclose that at least one rollable member movably abuts against at least one anti-lock inclined surface, such that an anti-lock brake effect is provided. But when a braking force is increased, a friction force between the at least one rollable member and the at least one anti-lock inclined surface is enlarged. And the operation of the braking structure would become insensitive and slow.

Second, a slidable holder disclosed by the cited references is slidably received in a brake base. A brake shoe is disposed within the slidable holder. The brake shoe and a support member are integrally molded for being waterproof and dustproof. A dust cover sleeves on the support member and the brake base. But it is necessary to have an operational space between the support member and the brake base and an operational space between the dust cover and the brake base. The brake base has a space for receiving an elastomer. Therefore, the brake base and the slidable holder are designed to have a larger size.

Third, the slilable holder which is disclosed by the cited references moves along a curved groove defined in the brake base. Due to a curved movement of the slidable holder, a positioning shaft which is used to press the elastomer would have a large displacement relative to an abutting surface of the slidable holder.

The present invention has arisen to mitigate and/or obviate the disadvantages of the conventional anti-lock brake structure.

SUMMARY OF THE INVENTION

The main objective of the present invention is to provide an improved anti-lock brake structure for a brake system of a vehicle.

To achieve the objective, an anti-lock brake structure in accordance with the present invention comprises a brake base and a slidable holder which movably receive the brake base and slides relative to the brake base. A brake shoe is rubbed against a wheel rim of a vehicle and engaged with a positioning surface formed on the slidable holder. The brake shoe includes a brake pad and a mounting seat connected to the brake pad. The mounting seat reinforces the brake pad for preventing the brake pad from being easily deformed. And the brake shoe is easily replaced, when being worn.

Two anti-lock inclined surfaces are positioned between the brake base and the slidable holder. Each anti-lock surface has a shallow section and a deeper section located adjacent to the shallow section. The shallow section gradually slopes toward the deeper section along a rotating direction of the wheel rim. Two wheel sets disposed between the brake base and the slidable holder. The two wheel sets respectively and movably abut against the two anti-lock surfaces.

A seat member is connected to the slidable holder and has a receiving space defined therein. An elastomer is compressively received in the receiving space of the seat member. In this manner, the brake base and the slidable holder have an improved smaller size compared with the prior art.

A positioning sleeve is connected the seat member with the slidable holder. The positioning sleeve has a positioning hole defined therein. A fixing nut is positioned in the receiving space and screwed with the positioning sleeve for securely connecting the slidable holder with the seat member. An assisting sleeve is coaxially and movably received in the positioning hole. The assisting sleeve has a plurality of assisting members disposed on an outer periphery thereof. A positioning shaft coaxially and slidably passes through the positioning sleeve for axially moving relative to the positioning sleeve. The positioning shaft has two ends respectively abutting against the brake base and the elastomer. Because the positioning shaft would not move with the slidable holder, a range of the displacement between the brake base and the positioning shaft is smaller than that of the prior art.

When the positioning sleeve axially moves relative to the positioning shaft, the positioning shaft simultaneously and axially moves to abut against the elastomer. Moreover, the assisting members provide the positioning shaft for smoothly sliding along the positioning hole of the positioning sleeve.

A dust casing receives the slidable holder and the brake shoe. A binding member is securely sleeved on the dust casing. The dust casing provides the anti-lock brake structure for waterproofing and dust proofing.

Accordingly, when the slidable holder and the brake shoe move relative to the brake base, each wheel set rolls and reciprocates between the shallow section and the deeper section of the corresponding anti-lock inclined surface. The brake shoe is tightly or loosely rubbed against the wheel rim of the vehicle to provide an anti-lock brake effect.

Further benefits and advantages of the present invention will become apparent after a careful reading of the detailed description with appropriate reference to the accompanying drawings.

DETAILED DESCRIPTION OF THE INVENTION

Figure 1:
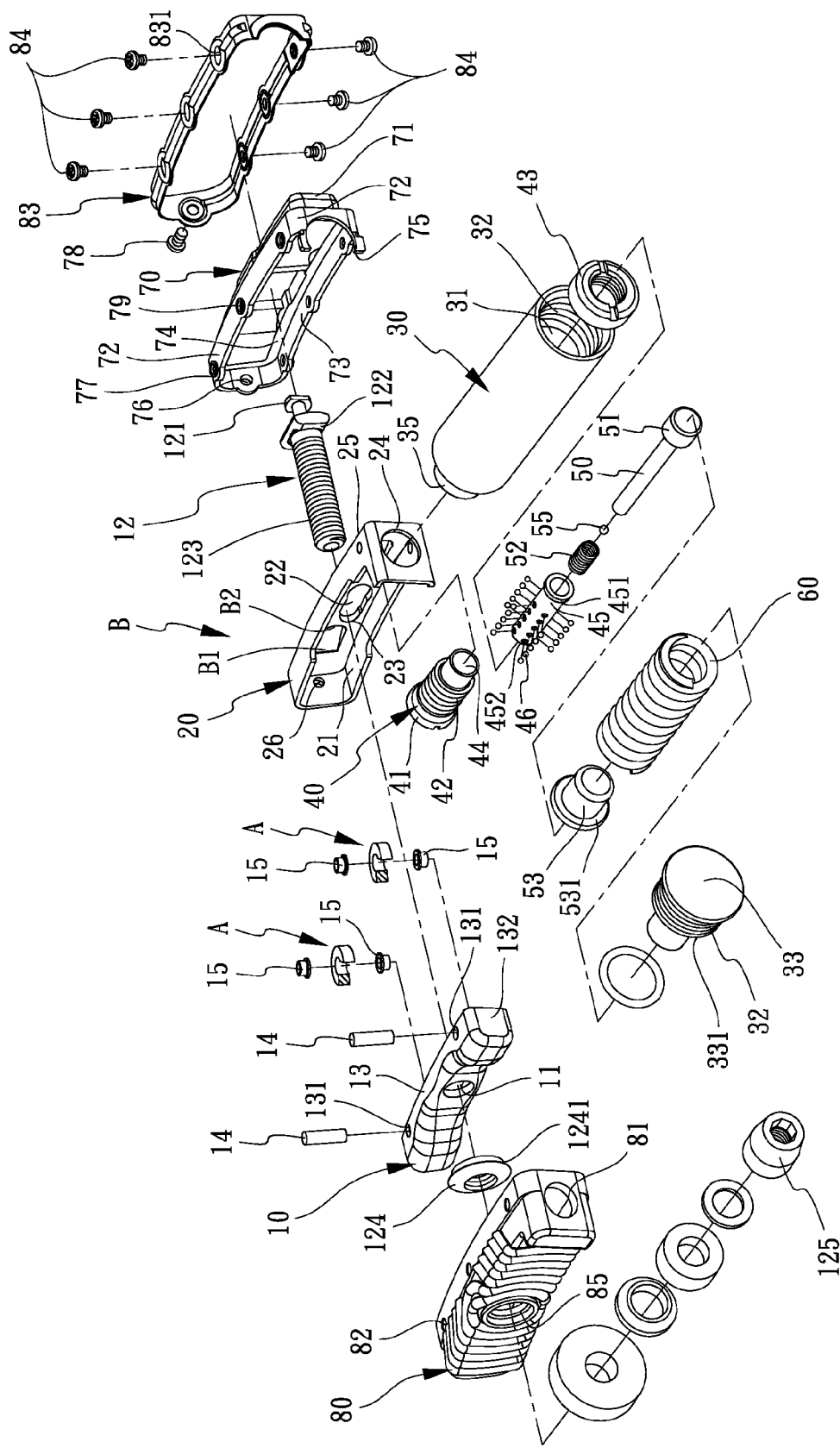
FIG. 1 is an exploded perspective view of a preferred embodiment of an anti-lock brake structure in accordance with the present invention.
Figure 2:
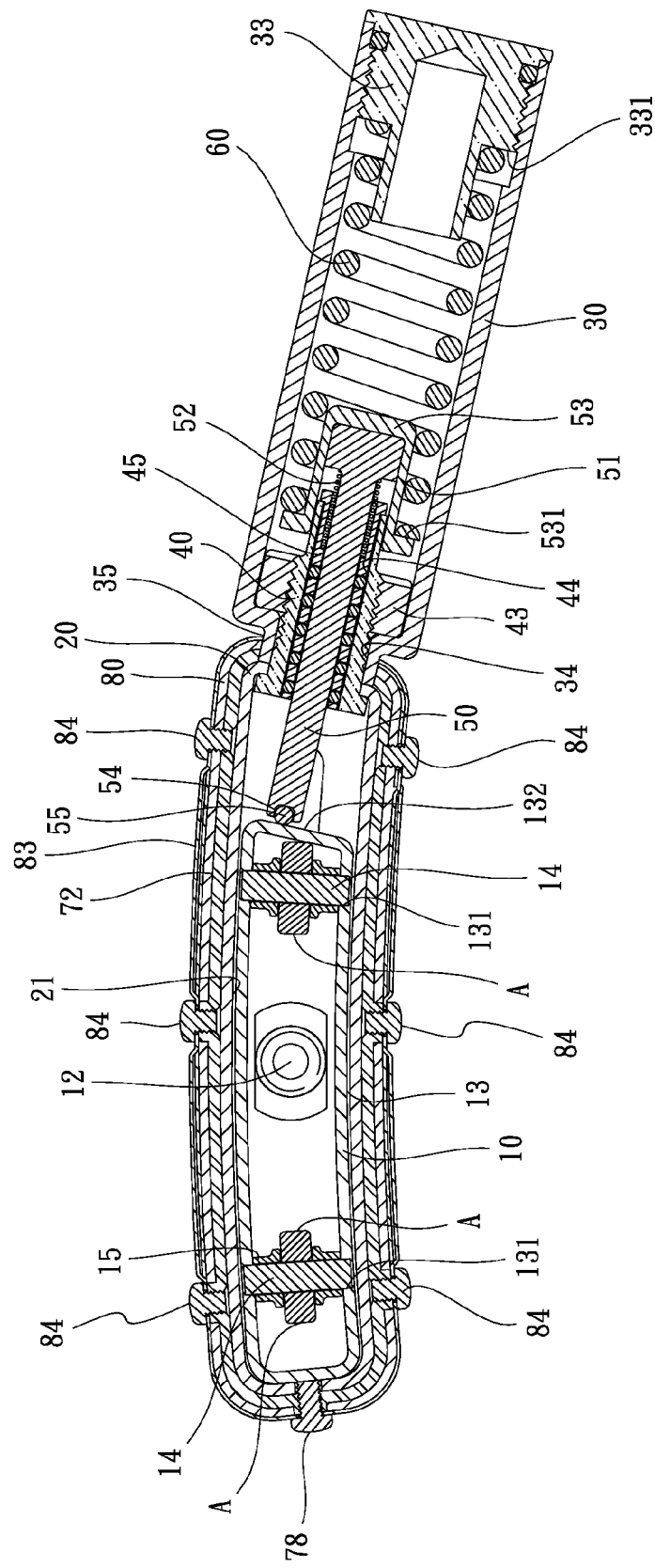
FIG. 2 is an assembled and cross-sectional front view of the preferred embodiment of the anti-lock brake structure in accordance with the present invention.
Figure 3:
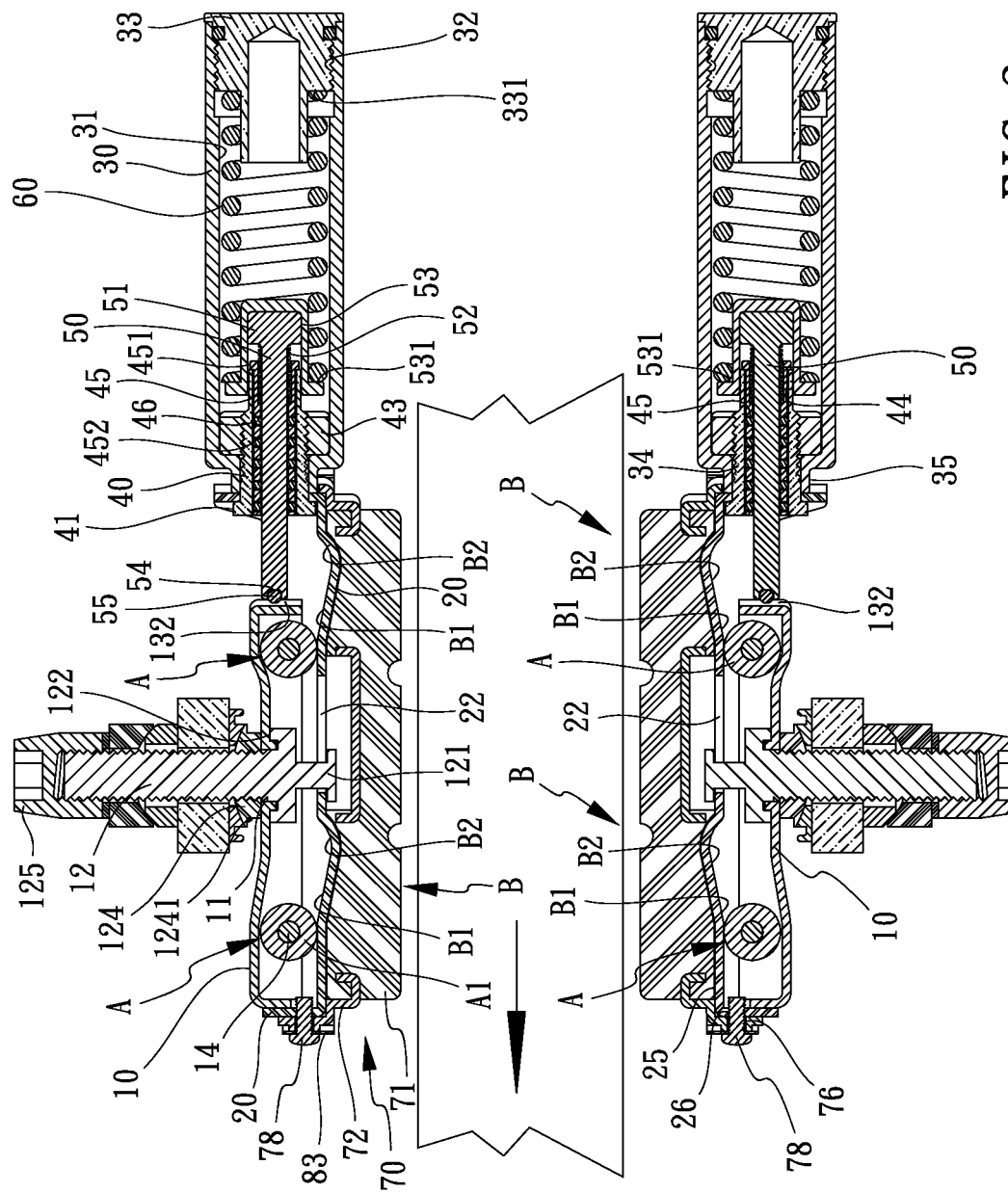
FIG. 3 is a cross-sectional side view of the preferred embodiment of the anti-lock brake structure in accordance with the present invention when rubbing against a wheel rim of a vehicle.

Referring to the drawings and initially to FIGS. 1-5, an anti-lock brake structure in accordance with the present invention is disposed on a brake system of a vehicle and comprises an elongated brake base 10 having a curved guiding portion 13 longitudinally formed on a lateral thereof. The curved guiding portion 13 of the brake base 10 has two bores 131 respectively defined in two ends thereof and vertically extending therethrough. The brake base 10 has an abutting surface 132 laterally positioned on one end thereof. The brake base 10 has a through hole 11 horizontally defined therein and correspondingly located on an assembled position of the brake system (not shown).

A fixing bolt 12 passes through the through hole 11 of the brake base 10. The fixing bolt 12 has a first flange 121 formed on one end thereof. The fixing bore 12 has a second flange 122 formed thereon and spacedly located from the first flange 121. The fixed bolt 12 has a threaded portion 123 formed on an outer periphery thereof and located adjacent to the second flange 122. The second flange 122 is positioned at and abuts against a surface around the through hole 11 of the brake base 10. A first nut 124 is threadedly connected to the threaded portion 123 of the fixing bolt 12 for fastening the fixing bolt 12 with the brake base 10. The first nut 124 has a stepped outer periphery 1241 formed thereon. A second nut 125 is threadedly connected to the threaded portion 123 of the fixing bolt 12 and located near the first nut 124 for fastening the fixing bolt 12 with the brake system (not shown).

Two fixing shafts 14 respectively pass through the two bores 131 of the brake base 10. When the two fixing shafts 14 are respectively and rivetedly disposed within the two bores 131, the two ends of each bore 131 would be narrowed for preventing the corresponding fixing shaft 14 from falling out. Each fixing shaft 14 has a wheel set A and two support washers 15 rollably sleeving thereon. Each wheel set A is coaxially disposed between the two support washers 15.

A slidable holder 20 has a curved guiding groove 21 longitudinally defined therein. The curved guiding groove 21 corresponds to the curved guiding portion 13 of the brake base 10 for movably receiving the curved guiding portion 13 of the brake base 10. The slidable holder 20 has an elongated hole 22 defined in a bottom of the curved guiding groove 21. The fixing bolt 12 sequentially passes through the elongated hole 22 of the slidable holder 20 and the through hole 11 of the brake base 10. The first flange 121 of the fixing bolt 12 is positioned at and abuts against a surface 23 around the elongated hole 22 of the slidable holder 20, such that the slidable holder 20 is movably connected to the brake base 10 via the fixing bolt 12. The slidable holder 20 has a positioning surface 25 formed thereon and located opposite to the curved guiding groove 21. The slidable holder 20 has a through hole 24 defined in one end thereof and communicating with the curved guiding groove 21. The through hole 24 of the slidable holder 20 corresponds to a location of the abutting surface 132 of the brake base 10. A screw hole 26 is defined in the other end of the slidable holder 20 and located opposite to the through hole 24.

Two anti-lock inclined surfaces B are positioned on the bottom of the curved guiding groove 21 of the slidable holder 20 and respectively located at two opposite sides of the elongated hole 22. The two anti-lock inclined surfaces B respectively and correspondingly receive the two wheel sets A which are disposed on the curved guiding portion 13 of the brake base 10. Each anti-lock surface B has a shallow section B1 and a deeper section B2 located adjacent to the shallow section B1. The shallow section B1 gradually slopes toward the deeper section B2 along a rotating direction of a wheel rim (not numbered) of the vehicle. Wherein when the slidable holder 20 moves relative to the brake base 10, each wheel set A rolls and reciprocates between the shallow section B1 and the deeper section B2 of the corresponding anti-lock inclined surface B.

A seat member 30 is connected to the slidable holder 20 and has a receiving space 31 defined therein. The seat member 30 has a threaded opening 32 defined in one end thereof and communicating with the receiving space 31. A cover 33 is threaded within the threaded opening 32 of the seat member 30. The cover 33 has an abutting surface 331 positioned on one end thereof and facing toward the receiving space 31. The seat member 30 has an opening 34 defined in the other end thereof which is located opposite to the threaded opening 32 and communicating with the receiving space 31. The end of the seat member 30 which forms the opening 34 has a stepped outer periphery 35.

A positioning sleeve 40 passes through the through hole 24 of the slidable holder 20 and the opening 34 of the seat member 30. The positioning sleeve 40 has a flange 41 annularly formed on an outer periphery thereof for abutting against a surface around the through hole 24 of the slidable holder 20. The positioning sleeve 40 has a threaded portion 42 annularly formed on the outer periphery thereof. The positioning sleeve 40 has a positioning hole 44 axially defined therein. A fixing nut 43 is positioned in the receiving space 31 of the seat member 30 and screwed with the threaded portion 42 of the positioning sleeve 40 for connecting the slidable holder 20 with the seat member 30.

An assisting sleeve 45 is coaxially and movably received in the positioning hole 44 of the positioning sleeve 40. The assisting sleeve 45 has a flange 451 annularly formed on one end thereof. The assisting sleeve 45 has a plurality of apertures 452 defined in an outer periphery thereof. Each aperture 452 receives an assisting member 46.

A positioning shaft 50 is coaxially and slidably received in the assisting sleeve 45 for axially moving relative to the positioning sleeve 40. A first end of the positioning shaft 50 has an indentation 54 defined therein. A second end of the positioning shaft 50 has an annular flange 51 outwardly formed thereon and located opposite to the indentation 54. A spring 52 is compressively sleeved on the positioning shaft 50. Two ends of the spring 52 respectively abut against the annular flange 51 of the positioning shaft 50 and the flange 451 of the assisting sleeve 45 for preventing the assisting sleeve 45 from uncontrollably sliding. The first end of the positioning shaft 50 protrudes from the positioning hole 44 of the positioning sleeve 40. A slipping member 55 is movably disposed between the indentation 55 of the positioning shaft 50 and the abutting surface 132 of the brake base 10.

When the positioning sleeve 40 moves relative to the positioning shaft 50, the positioning shaft 50 simultaneously rubs against the assisting members 46 to roll. And the assisting sleeve 45 is driven to axially move by the movement of the assisting members 46. The assisting members 46 provide the positioning shaft 50 for smoothly sliding along the positioning hole 44 of the positioning sleeve 40. A pusher 53 is axially received in the receiving space 31 and has one end abutting against the annular flange 51 of the positioning shaft 50 opposite to the spring 52. The pusher 53 has a pushing surface 531 formed thereon.

An elastic member 60 is coaxially and compressively received in the receiving space 31 of the seat member 30. The elastic member 60 has two ends respectively abutting against the abutting surface 331 of the cover 33 and the pushing surface 531 of the pusher 53. When the slidable holder 20 moves relative to the brake base 10, the positioning sleeve 40 axially moves relative to the positioning shaft 50. The positioning shaft 50 and the pusher 53 simultaneously and axially move to compressively abut against the elastic member 60. Then the elastic member 60 provides a biasing force to push the positioning shaft 50 backwardly, and the positioning shaft 50 pushes the slidable holder 20 to slide backward.

A brake shoe 70 is connected to the slidable holder 20 for pressing against the wheel rim of the vehicle. The brake shoe 70 includes a brake pad 71 and a mounting seat 72 connected to the brake pad 71. The brake shoe 70 has a curved recess 73 longitudinally defined in the mounting seat 72 and correspondingly receiving the slidable holder 20. The curved recess 73 has a connecting surface 74 formed on an inner periphery thereof for correspondingly engaging with the positioning surface 25 of the slidable holder 20. The brake shoe 70 is easily replaced when being worn.

One end of the brake shoe 70 has an engaging portion 75 formed thereon for engaging with the stepped outer periphery 35 of the seat member 30. The opposite end of the brake shoe 70 has a screw hole 76 defined therein and corresponding to a location of the screw hole 26 of the slidable holder 20. A plurality of screw holes 79 are defined in the mounting seat 72 and spacedly located around an outer periphery of the curved recess 73. The mounting seat 72 has a plurality of semi-circular protrusions 77 spacedly formed thereon and extending from a peripheral edge of the curved recess 73. The semi-circular protrusions 77 are correspondingly disposed around the screw holes 76, 79.

A dust casing 80 receives the slidable holder 20 and the brake shoe 70. The dust casing 80 has a through hole 81 defined in one end thereof and corresponding to a size of the stepped outer periphery 35 of the seat member 30 for engaging with the stepped outer periphery 35 of the seat member 30. The dust casing 80 has a plurality of bores 82 spacedly defined therein and corresponding to the semi-circular protrusions 77 of the brake shoe 70. The dust casing 80 has a stepped hole 85 laterally and horizontally defined therein and corresponding to a location of the through hole 11 of the brake base 10. The stepped hole 85 receives the first nut 124, and the inner periphery of the stepped hole 85 abuts against the outer stepped periphery 1241 of the first nut 124.

A binding member 83 is securely sleeved on the dust casing 80. The binding member 83 has a plurality of bores 831 defined therein and corresponding to the locations of the screw holes 76, 79 of the brake shoe 70. A screw 78 passes through the corresponding bore 831 of the binding member 83, the screw hole 76 of the brake shoe 70 and the screw hole 26 of the slidable holder 20. A plurality of screws 84 respectively pass through the corresponding bores 831 of the binding member 83 and the screw holes 79 of the brake shoe 70, such that the brake shoe 70 and the slidable holder 20 are fastened together via the screws 78, 84. The dust casing 80 sealingly receives the mounting seat 72 of the brake shoe 70 and the binding member 83 is positioned at the semi-circular protrusions 77 of the brake shoe 70. The dust casing 80 provides the anit-lock brake assembly for waterproofing and dust proofing.

Figure 4:
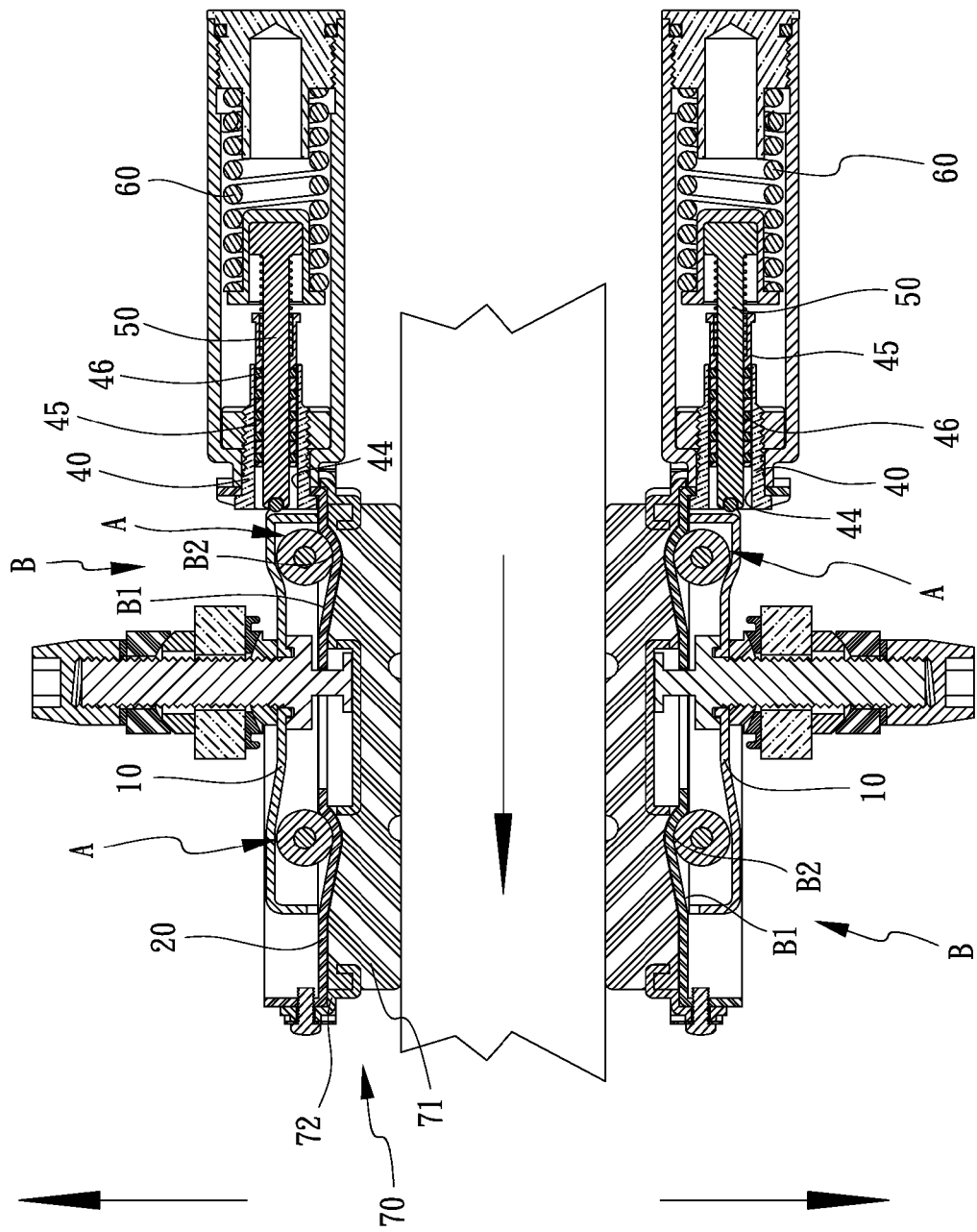
FIG. 4 is an operational and cross-sectional view of the preferred embodiment of the anti-lock brake structure in accordance with the present invention when a brake shoe is loosely rubbed against the wheel rim of the vehicle.

As shown in FIG. 4, an inertial force of the vehicle is greater than the biasing force of the elastic member 60, when an emergency brake is operated. Accordingly, the brake shoe 70 and the slidable holder 20 would slide relative to the brake base 10 by the inertial force of the vehicle. The elastic member 60 is axially compressed by the movement of the seat member 30 which is driven by the brake shoe 70 and the slidable holder 20. The positioning sleeve 40 axially moves relative to the positioning shaft 50. Each wheel set A simultaneously rolls from the shallow section B1 to the deeper section B2 of the corresponding anti-lock inclined surface B of the slidable holder 20. The brake shoe 70 is retracted toward the brake base 10 and loosely rubbed against the wheel rim of the vehicle as each wheel set A is rolled into the deeper section B2 of the corresponding anti-lock inclined surface B.

Figure 5:
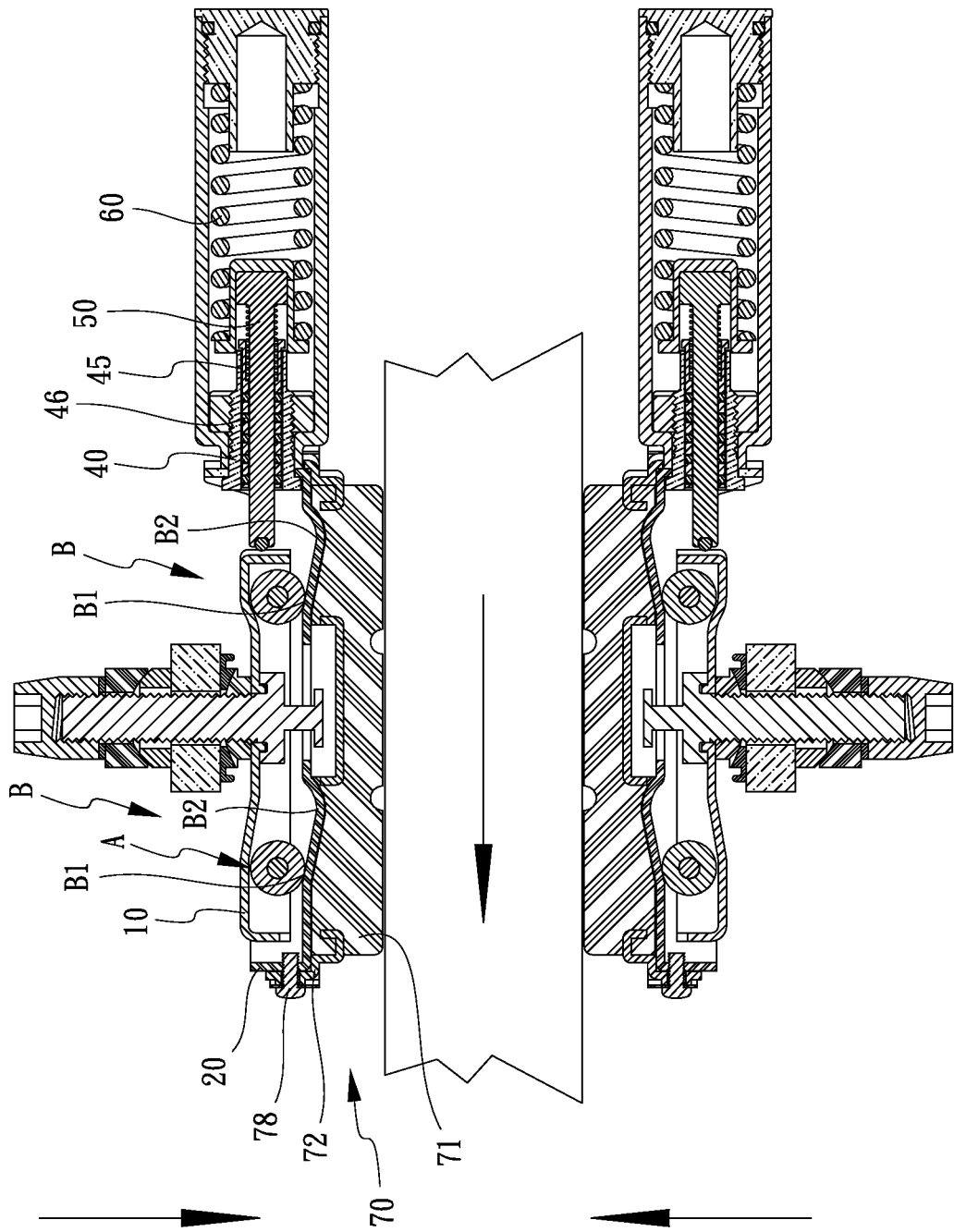
FIG. 5 is an operational and cross-sectional view of the preferred embodiment of the anti-lock brake structure in accordance with the present invention when the brake shoe is tightly rubbed against the wheel rim of the vehicle.
Figure 6:
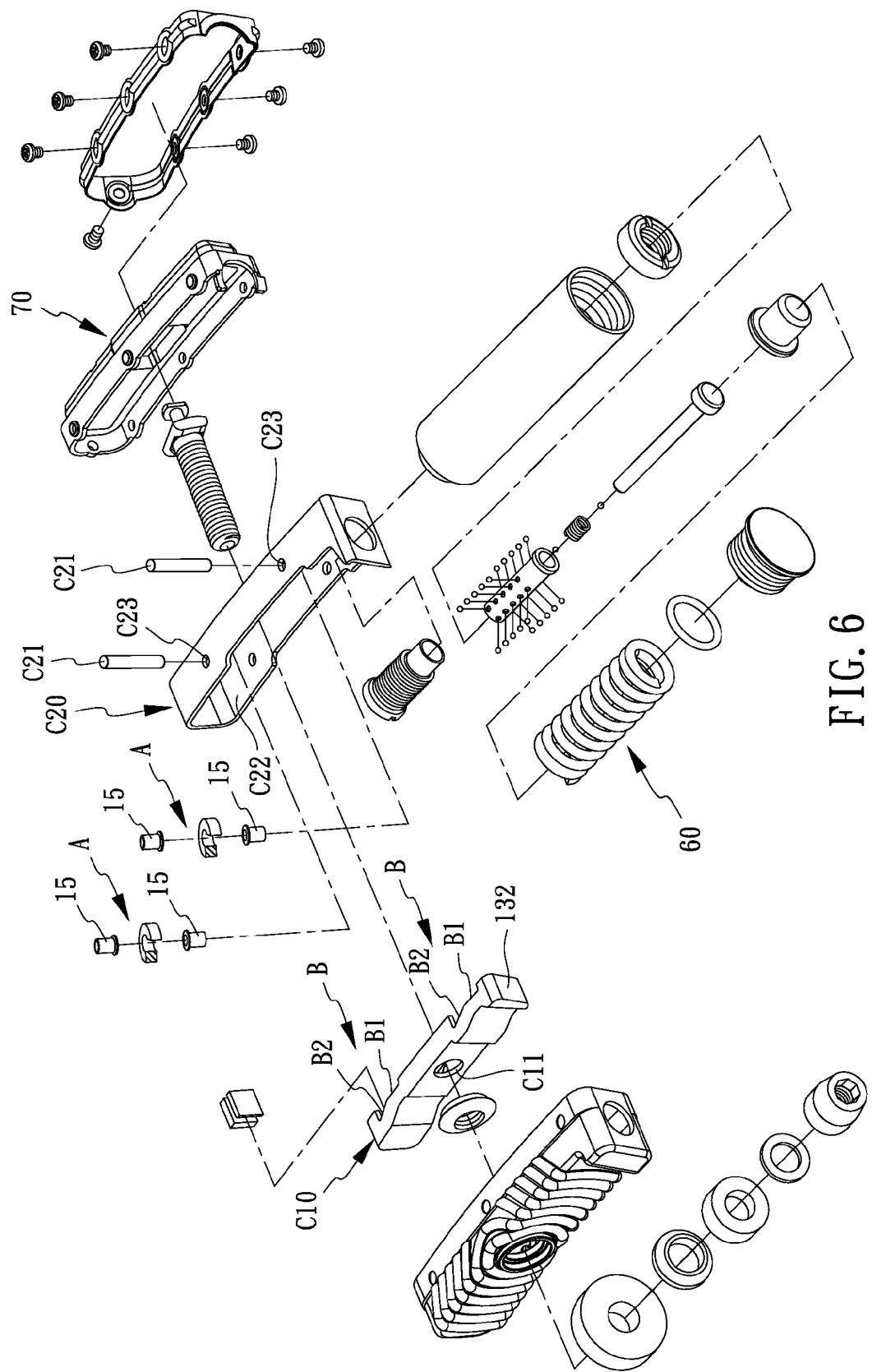
FIG. 6 is an exploded perspective view of a second embodiment of the anti-lock brake structure in accordance with the present invention.

As shown in FIG. 5, when the brake shoe 70 is loosely rubbed against the wheel rim of the vehicle, the inertial force of the vehicle is smaller than the biasing force of the elastic member 60. The elastic member 60 pushes the slidable holder 20 and the brake shoe 70 backwardly to slide relative to the brake base 10 by the biasing force. Each wheel set A simultaneously rolls from the deeper section B2 to the shallow section B1 of the corresponding anti-lock inclined surface B of the slidable holder 20. The brake shoe 70 is pressed away from the brake base 10 and tightly rubbed against the wheel rim of the vehicle.

Therefore, when braking, the curved guiding portion 13 of the brake base 10 slides along the curved guiding groove 21 of the slidable holder 20. The slidable holder 20 and the brake shoe 70 move relative to the brake base 10. Each wheel set A rolls and reciprocates between the shallow section B1 and the deeper section B2 of the corresponding anti-lock inclined surface B of the slidable holder 20. The brake shoe 70 is tightly or loosely rubbed against the wheel rim of the vehicle to provide an anti-lock brake effect.

With reference to FIGS. 6-9, those show a second embodiment of the anti-lock brake structure in accordance with the present invention. The elements and effects of the second embodiment which are the same with the preferred embodiment are not described, only the differences are described. In this embodiment, the curved guiding portion 13 of the brake base C10 has two anti-lock inclined surfaces B laterally positioned on the curved guiding portion 13 of the brake base C10 and respectively located at two opposite sides of the through hole C11. Each anti-lock inclined surface B has a shallow section B1 and a deeper section B2 located adjacent to the shallow section B1. The shallow section B1 gradually slopes toward the deeper section B2 along the rotating direction of the wheel rim of the vehicle.

The slidable holder C20 has two bores C23 respectively defined in two ends thereof and vertically extending therethrough. The two bores C23 communicate the curved guiding groove C22. Two fixing shafts C21 respectively pass through the two bores C23 of the slidable holder C20. When the two fixing shafts C21 are respectively and rivetedly disposed within the two bores C23, the two ends of each bore C23 would be narrowed for preventing the corresponding fixing shaft C21 from falling out. Each fixing shaft C21 has a wheel set A and two support washers 15 rollably sleeving thereon. Each wheel set A is coaxially disposed between the two support washers 15. The two wheel sets A which are disposed on the slidable holder C20 are respectively and correspondingly received in the two anti-lock inclined surfaces B of the brake base C10.

Figure 7:
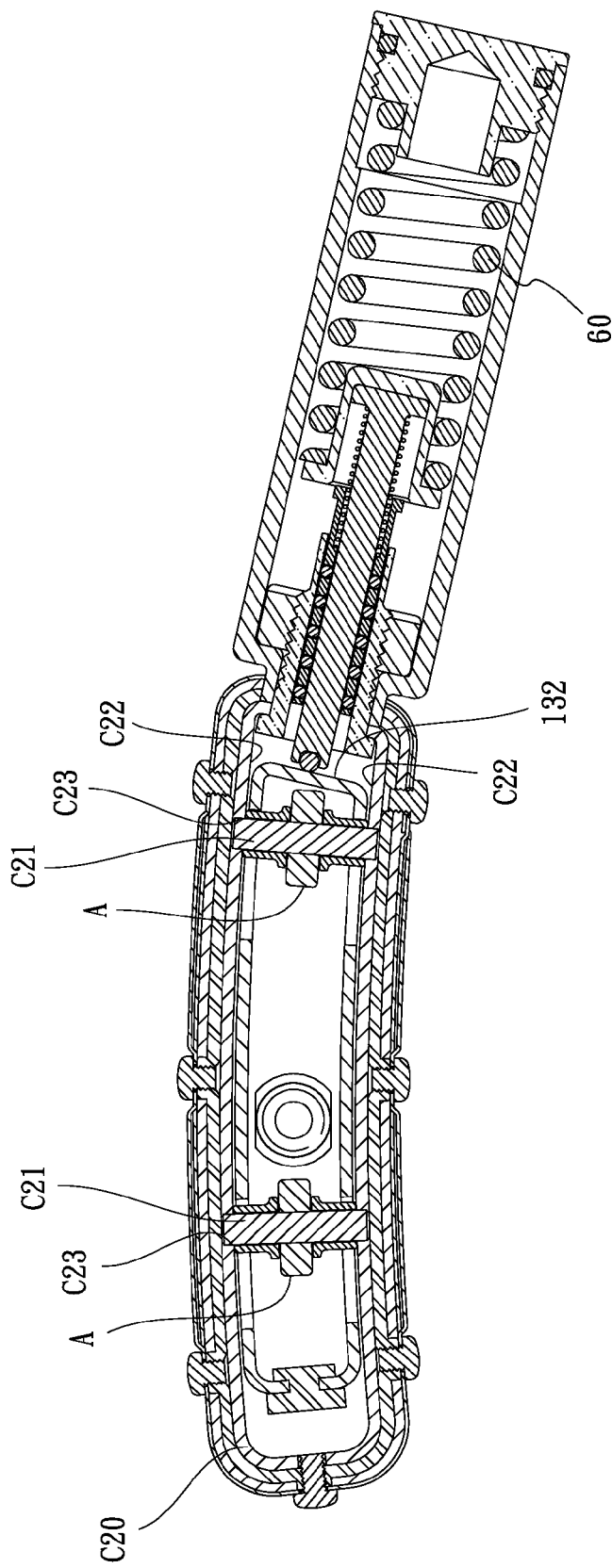
FIG. 7 is an assembled and cross-sectional front view of the second embodiment of the anti-lock brake structure in accordance with the present invention.
Figure 8:
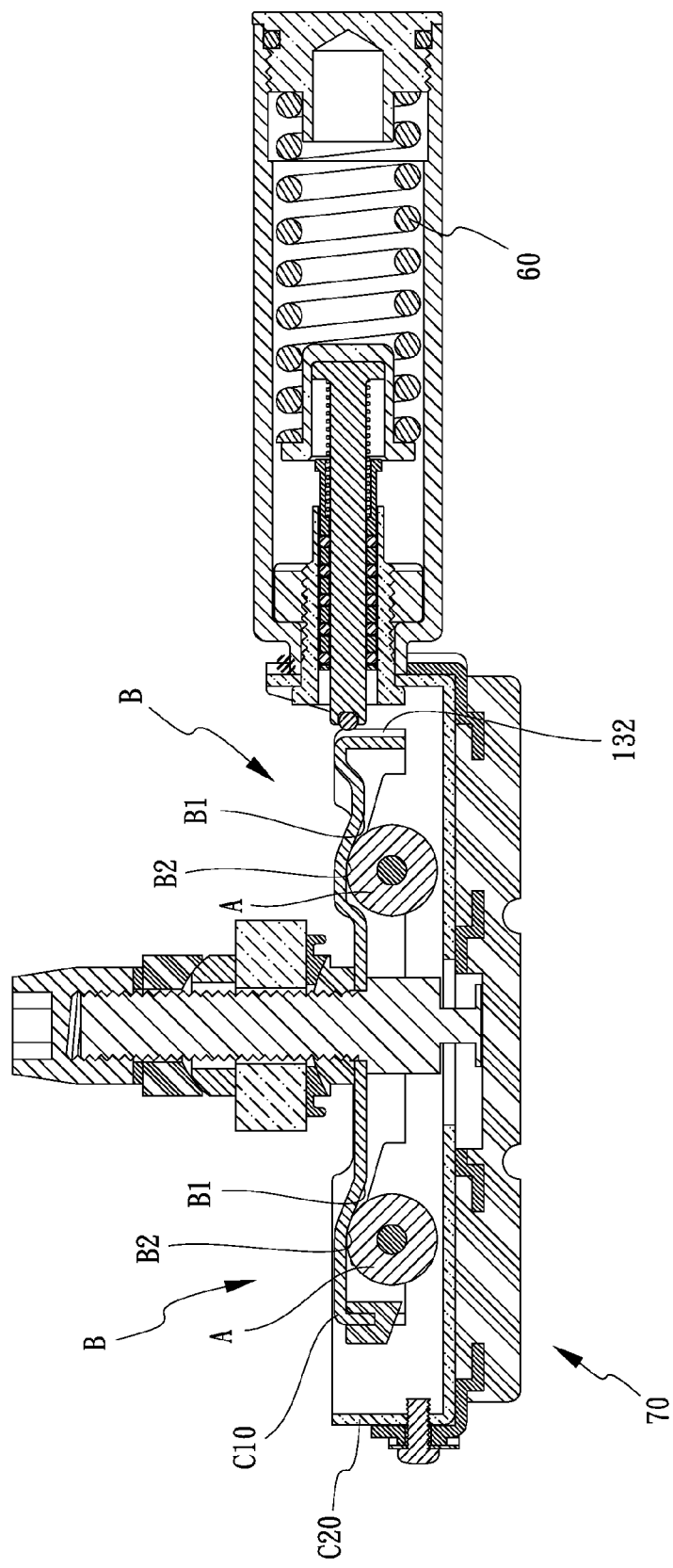
FIG. 8 is an operational and cross-sectional view of the second embodiment of the anti-lock brake structure in accordance with the present invention when each wheel set is rolled into a deeper section of a corresponding anti-lock inclined surface.

As shown in FIG. 7-8, when the slidable holder C20 and the brake shoe 70 move relative to the brake base C10, each wheel set A simultaneously rolls from the shallow section B1 to the deeper section B2 of the corresponding anti-lock inclined surface B of the brake base C10. The brake shoe 70 is retracted toward the brake base C10 and loosely rubbed against the wheel rim of the vehicle (not shown).

Figure 9:
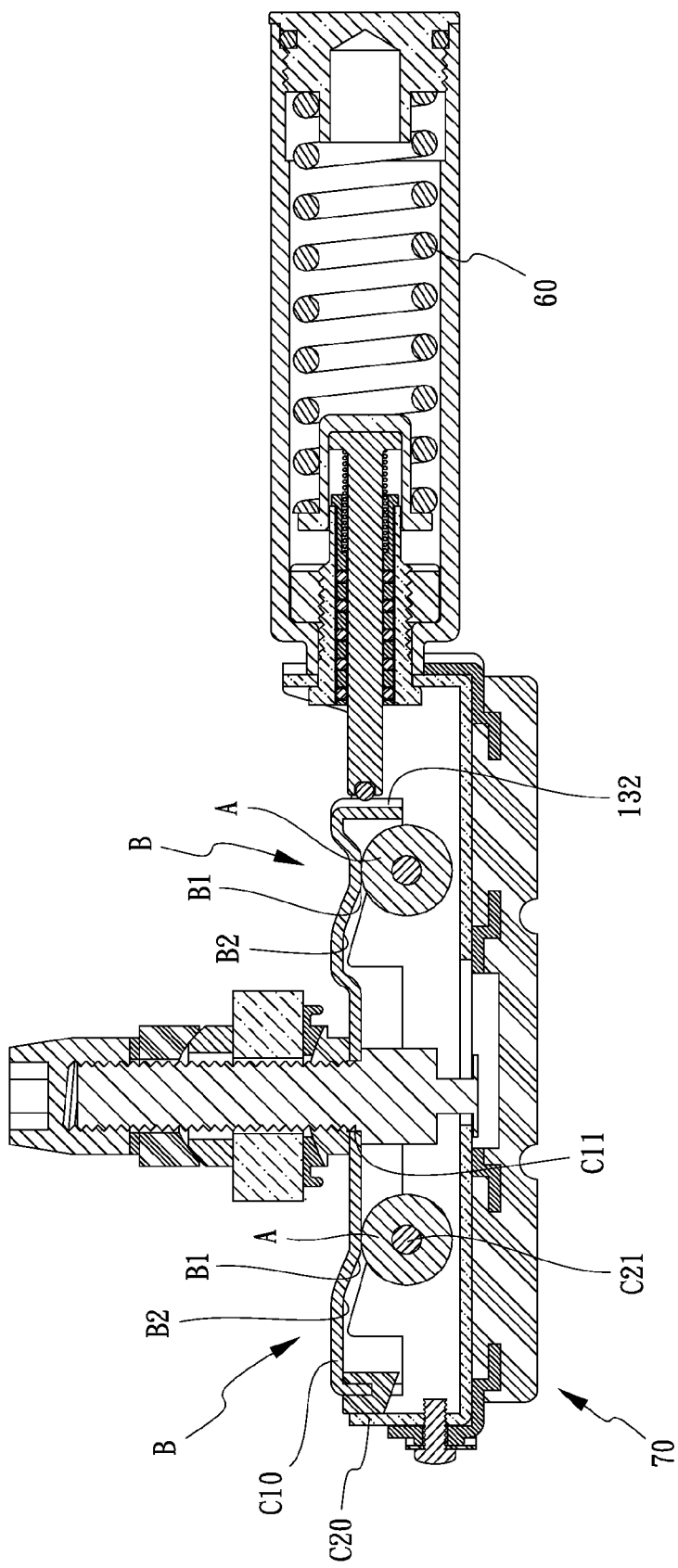
FIG. 9 is an operational and cross-sectional view of the second embodiment of the anti-lock brake structure in accordance with the present invention when each wheel set is rolled into a shallow section of the corresponding anti-lock inclined surface.

As shown in FIG. 9, the brake shoe 70 slide backwardly relative to the brake base C10 by the biasing force of the elastic member 60. Each wheel set A simultaneously rolls from the deeper section B2 to the shallow section B1 of the corresponding anti-lock inclined surface B of the brake base C10. The brake shoe 70 is pressed away from the brake base C10 and tightly rubbed against the wheel rim of the vehicle (not shown).

Figure 10:
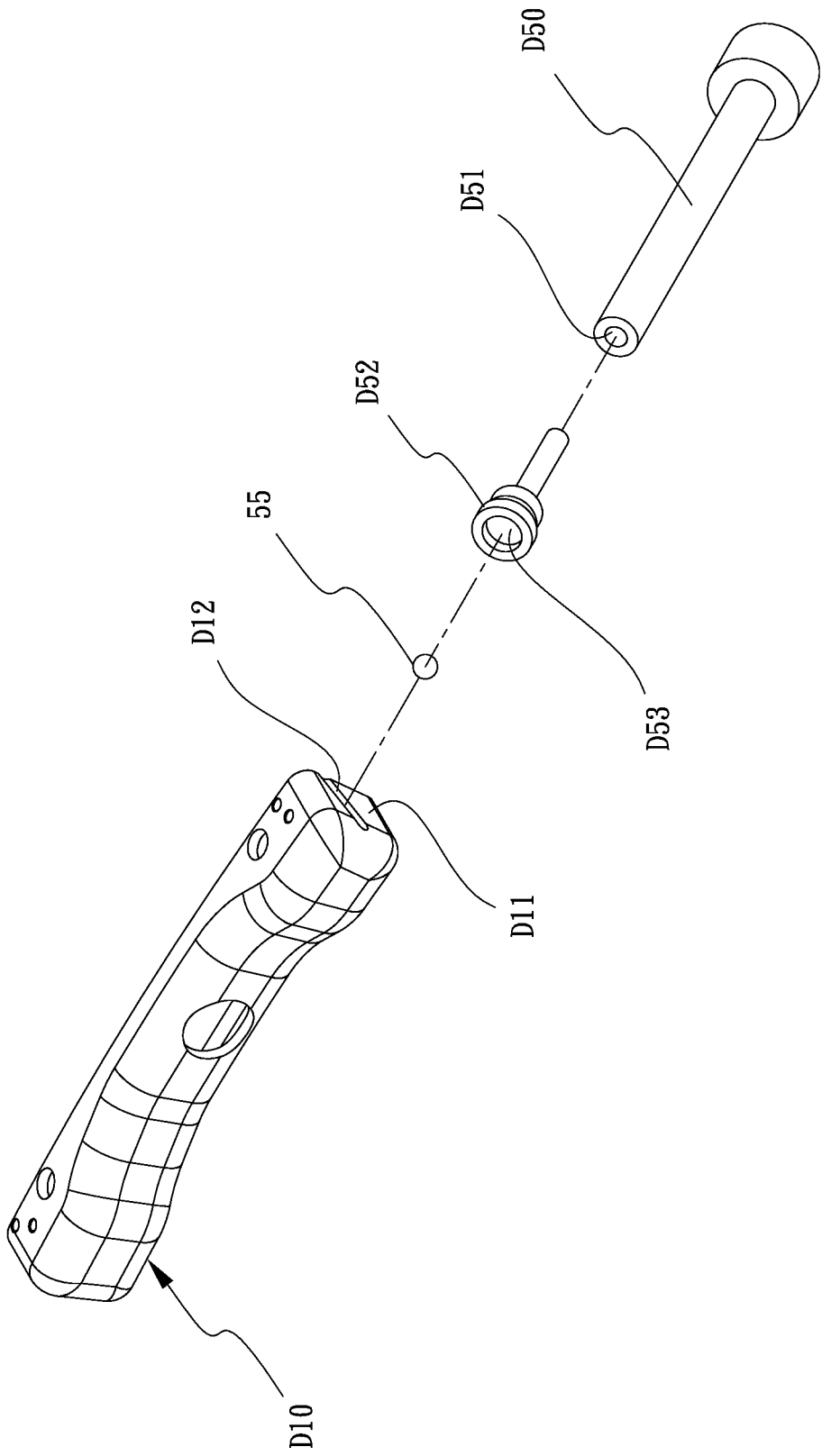
FIG. 10 is an exploded perspective view of a brake base, a slipping member, a pushing rod, and a positioning shaft of a third embodiment of the anti-lock brake structure in accordance with the present invention.
Figure 11:
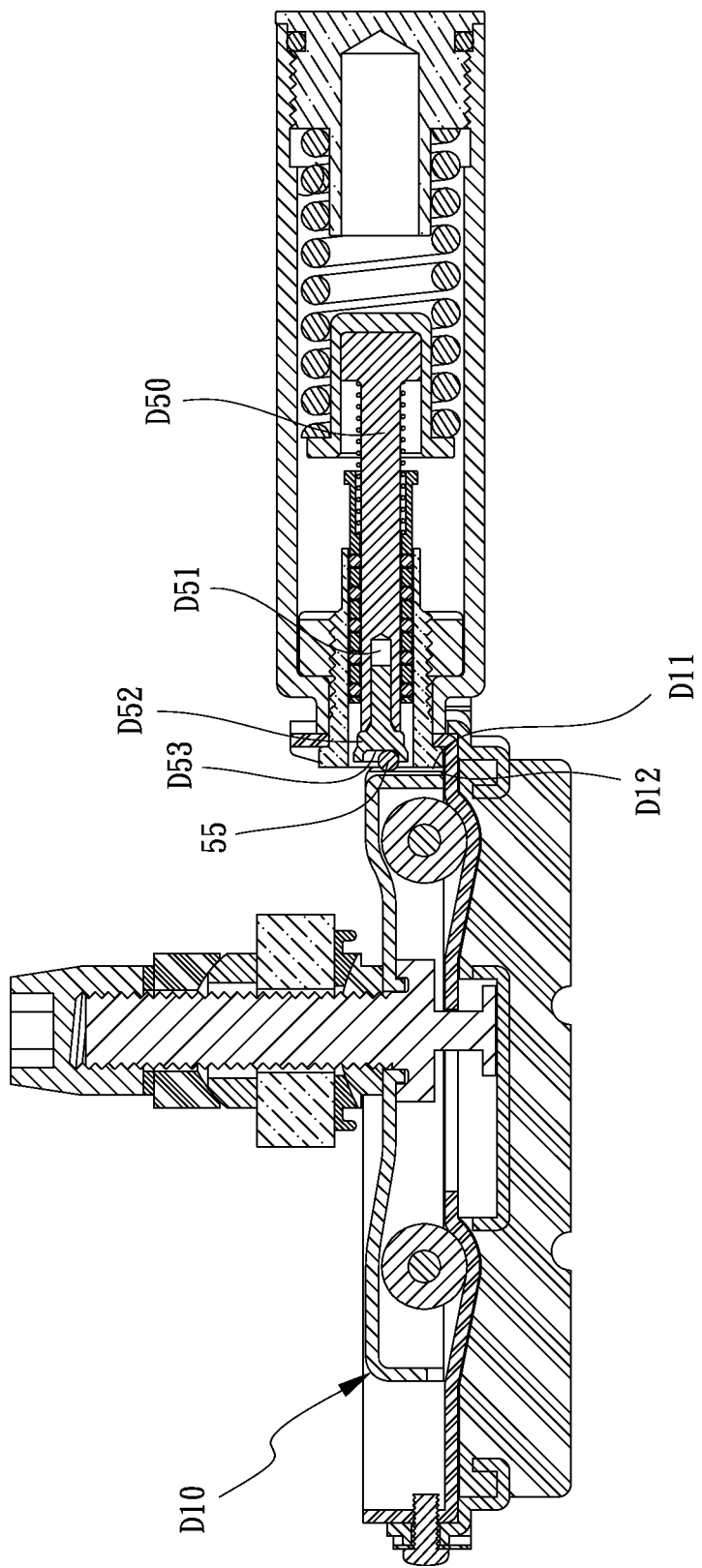
FIG. 11 is an operational and cross-sectional view of the third embodiment of the anti-lock brake structure in accordance with the present invention when each wheel set is rolled into the deeper section of the corresponding anti-lock inclined surface.
Figure 12:
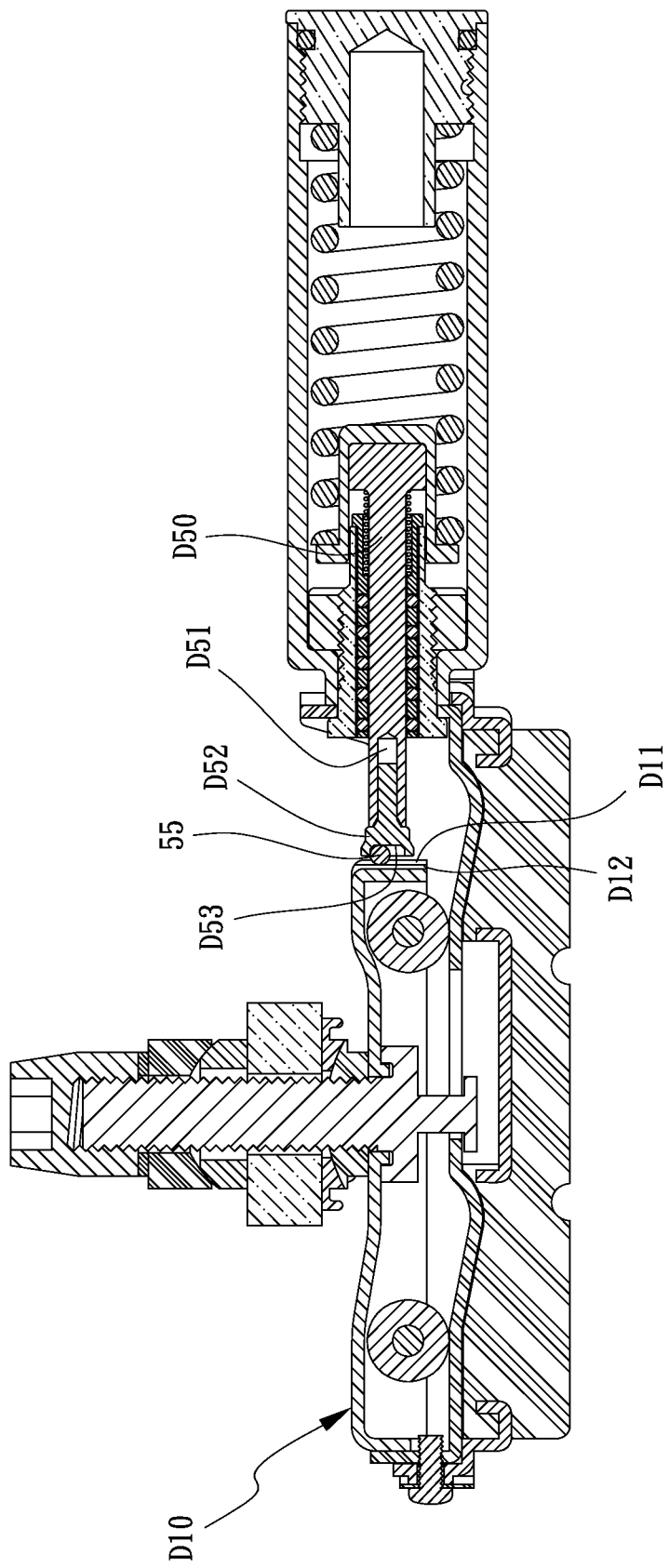
FIG. 12 is an operational and cross-sectional view of the third embodiment of the anti-lock brake structure in accordance with the present invention when each wheel set is rolled into the shallow section of the corresponding anti-lock inclined surface.
Figures 13, 14:
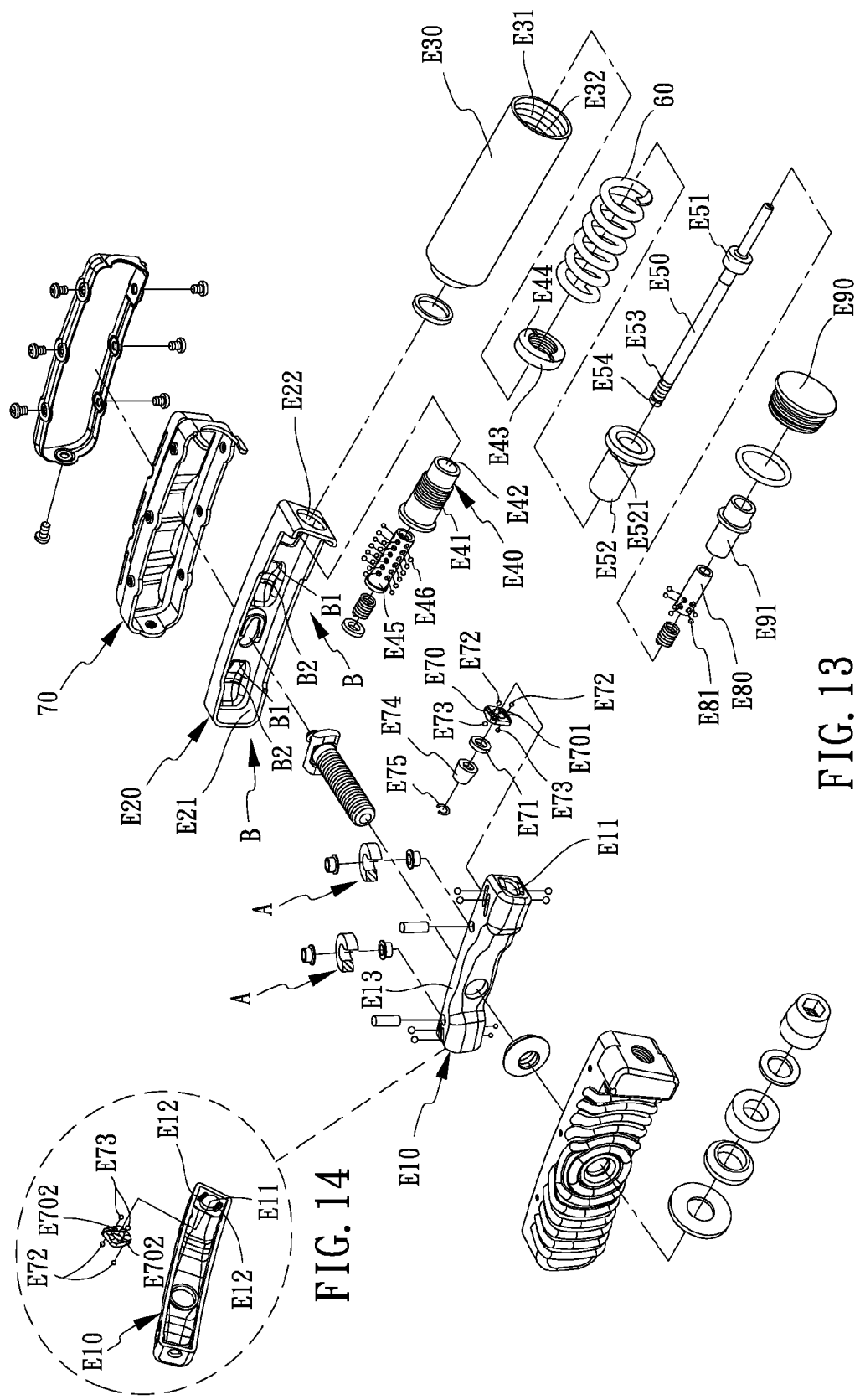
FIG. 13 is an exploded perspective view of a fourth embodiment of the anti-lock brake structure in accordance with the present invention.
FIG. 14 an exploded perspective view of a brake base and a first washer of the fourth embodiment of the anti-lock brake structure in accordance with the present invention.

With reference to FIGS. 10-12, those show a third embodiment of the anti-lock brake structure in accordance with the present invention. The elements and effects of the second embodiment which are the same with the preferred embodiment are not described, only the differences are described. In this embodiment, the abutting surface D11 of the brake base D10 has a sliding slot D12 defined therein.

The positioning shaft D50 has an elongated hole D51 defined in the first end thereof. A pushing rod D52 is received in the elongated hole D51 of the positioning shaft D50. The pushing rod D52 has a recess D53 defined in one end thereof and facing toward the brake base D10. A slipping member 55 is movably disposed and abuts against between the sliding slot D12 of the brake base D10 and the recess D53 of the pushing rod D52. The slipping member 55 is able to freely move in the recess D53 of the pushing rod D52 and slide along the sliding slot D12 of the brake base D10, such that the positioning shaft D50 smoothly moves relative to the brake base D10. FIGS. 11-12 show the operation of the third embodiment of the anti-lock brake structure in accordance with the in accordance with the present invention.

With reference to FIGS. 13-17, those show a fourth embodiment of the anti-lock brake structure in accordance with the present invention. The elements and effects of the second embodiment which are the same with the preferred embodiment are not described, only the differences are described. In this embodiment, the brake base E10 has an elongated opening E11 defined in one end thereof and located at the rotating direction of the wheel rim (not shown). Two elongated grooves E12 are defined in an inner surface of the end of the brake base E10 and correspondingly located on two opposite sides of the elongated opening E11.

The slidable holder E20 has a through hole E22 defined in one end thereof and communicating with the curved guiding groove E21. The through hole E22 corresponds to a location of the elongated opening E11 of the brake base E10, when the curved guiding portion E13 of the brake base E10 is movably received in the curved guiding groove E21 of the slidable holder E20.

The seat member E30 has a threaded opening E31 defined in one end thereof and communicating with the receiving space E32. The seat member E30 has an opening E33 defined in the other end thereof which is located opposite to the threaded opening E31 and communicating with the receiving space E32.

The positioning sleeve E40 passes through the through hole E22 of the slidable holder E20 and the opening E33 of the seat member E30. The positioning sleeve E40 has a threaded portion E41 annularly formed on an outer periphery thereof. The positioning sleeve E40 has a positioning hole E42 axially defined therein. A fixing nut E43 is positioned in the receiving space E32 of the seat member E30 and screwed with the threaded portion E41 of the positioning sleeve E40 for connecting the slidable holder E20 with the seat member E30.

A first assisting sleeve E45 is coaxially and movably received in the positioning hole E42 of the positioning sleeve E40. The first assisting sleeve E45 has a plurality of assisting members E46 disposed around an outer periphery thereof.

The positioning shaft E50 is coaxially and slidably received in the first assisting sleeve E45 for axially moving relative to the positioning sleeve E40. A first end of the positioning shaft E50 has a groove E54 annularly defined therein. The first end of the positioning shaft E50 has a threaded portion E53 annularly formed on an outer periphery thereof and located adjacent to the groove E54. A second end of the positioning shaft 50 has an annular flange E51 outwardly formed thereon and located opposite to the groove E54.

A pusher E52 is coaxially received in the receiving space E32 of the seat member E30 and sleeves on the second end of the positioning shaft E50. The annular flange E51 of the positioning shaft E50 is engaged with the pusher E52.

The elastic member E60 is coaxially sleeved on the positioning shaft E50 and compressively received in the receiving space E32 of the seat member E30. The elastic member E60 has two ends respectively abutting against a pushing surface E521 of the pusher E52 and an abutting surface E44 of the fixing nut E43.

The first end of the positioning shaft E50 protrudes from the positioning hole E42 of the positioning sleeve E40. A first washer E70 and a second washer E71 sleeve on the first end of the positioning shaft E50. The first washer E70 has two elongated channels E701 defined in one side thereof and correspondingly the location of the two elongated grooves E12 of the brake base E10. Two assisting members E72 are respectively and rollably disposed between the two elongated channels E701 and the two elongated grooves E12. The first washer E70 has two notches E702 defined in the other side thereof which is opposite to the side with the two elongated channels E701. Two abutting members E73 are respectively disposed in the two notches E702 rollably abut against between the first washer E70 and the second washer E71.

A connecting nut E74 is screwed on the threaded portion E53 of the positioning shaft E50 for retaining the first E70 and second washers E71 in place. A ring buckle E75 is disposed in the groove E54 of the positioning shaft E50. The connecting nut E74 is positioned at the ring buckle E75 by a reverse rotation of the connecting nut E74.

A second assisting sleeve E80 coaxially sleeves on the second end of the positioning shaft E50 and is located adjacent to the annular flange E51. The second assisting sleeve E80 has a plurality of assisting members E81 disposed around an outer periphery thereof. The second assisting sleeve E80 has two ends respectively sleeved in the pusher E52 and a positioning cylinder E91 which is received in the receiving space E32 of the seat member E30. The second end of the positioning shaft E50 is able to smoothly move relative to the positioning cylinder E91 by a movement between the assisting members E81 and the positioning cylinder E91. A cover E90 is threaded to the threaded opening E31 of the seat member E30 and connected to the positioning cylinder E91.

Figure 15:
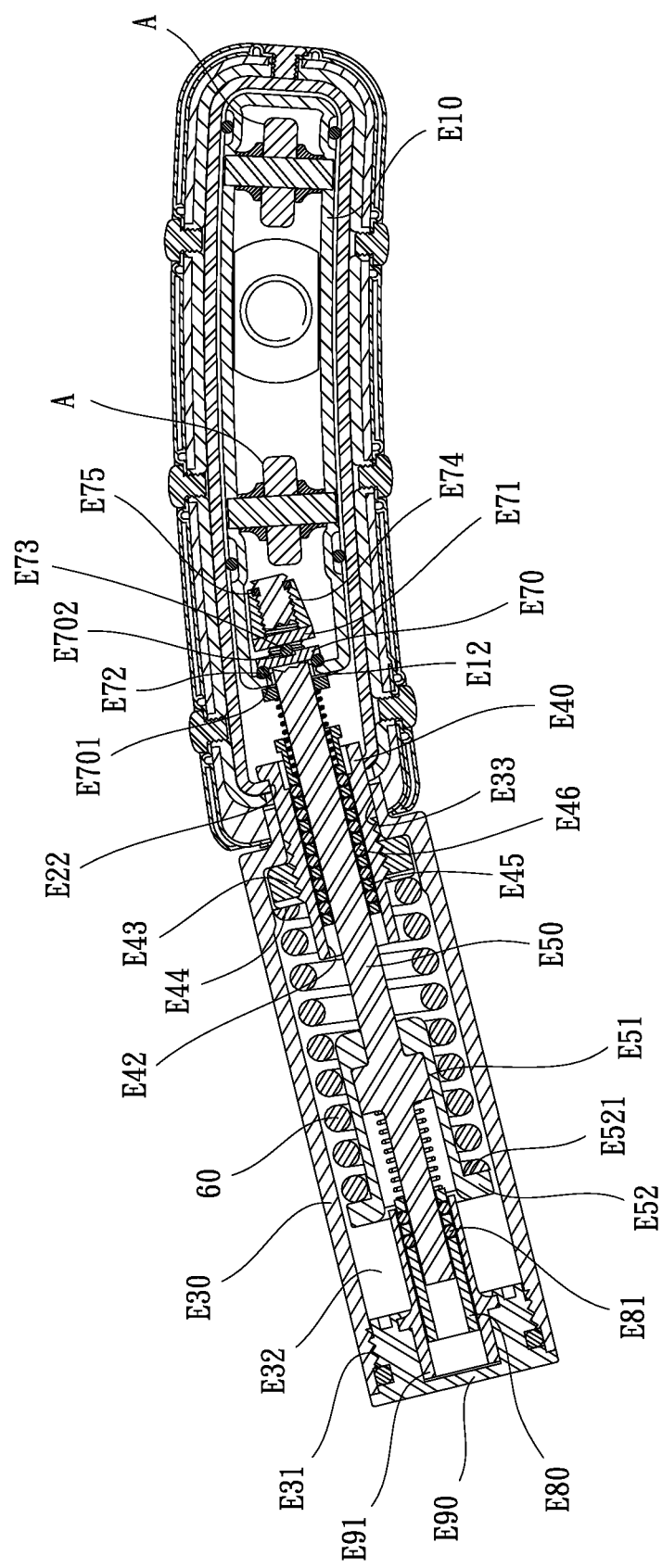
FIG. 15 is an assembled and cross-sectional front view of the fourth embodiment of the anti-lock brake structure in accordance with the present invention.
Figure 16:
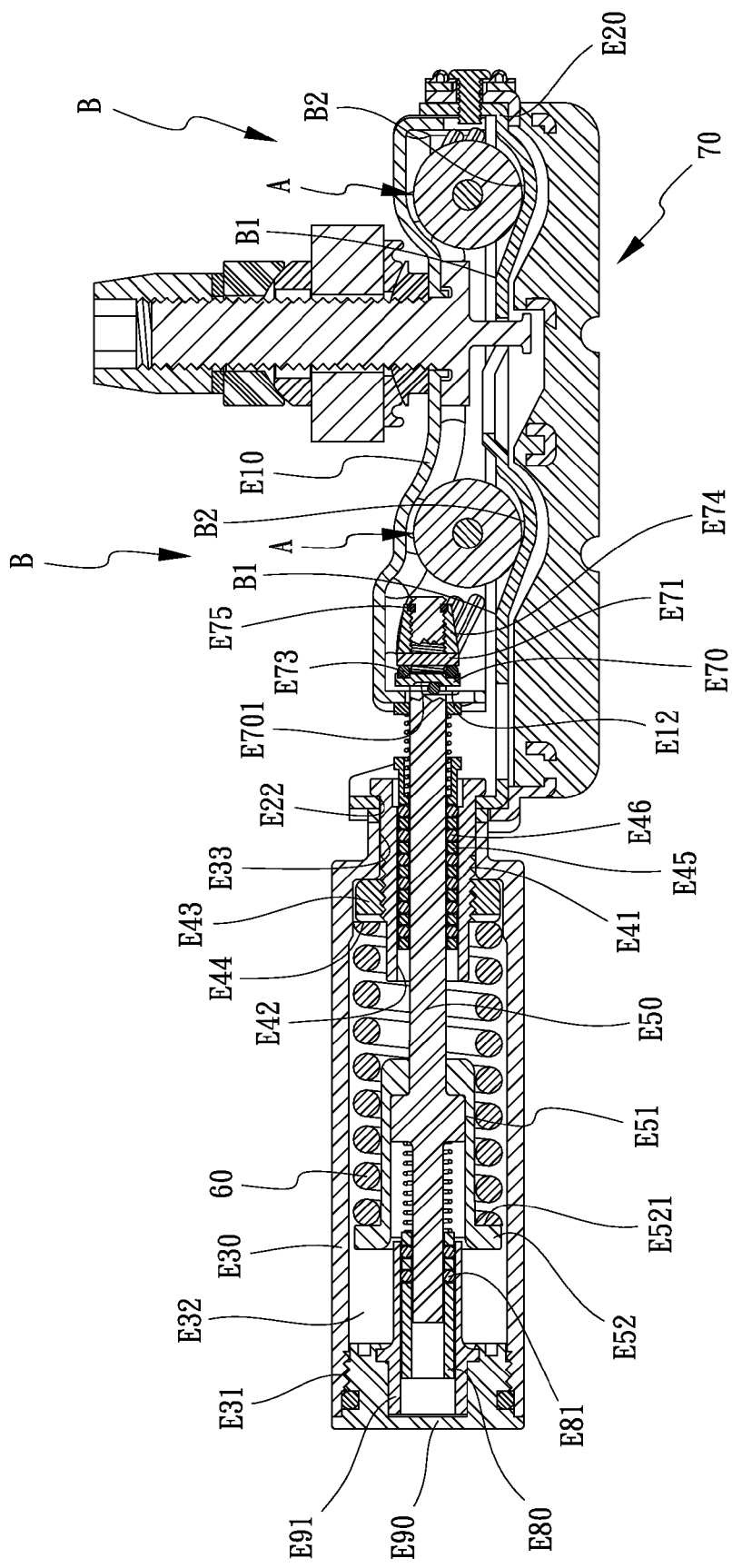
FIG. 16 is an operational and cross-sectional view of the fourth embodiment of the anti-lock brake structure in accordance with the present invention when each wheel set is rolled into the deeper section of the corresponding anti-lock inclined surface.
Figure 17:
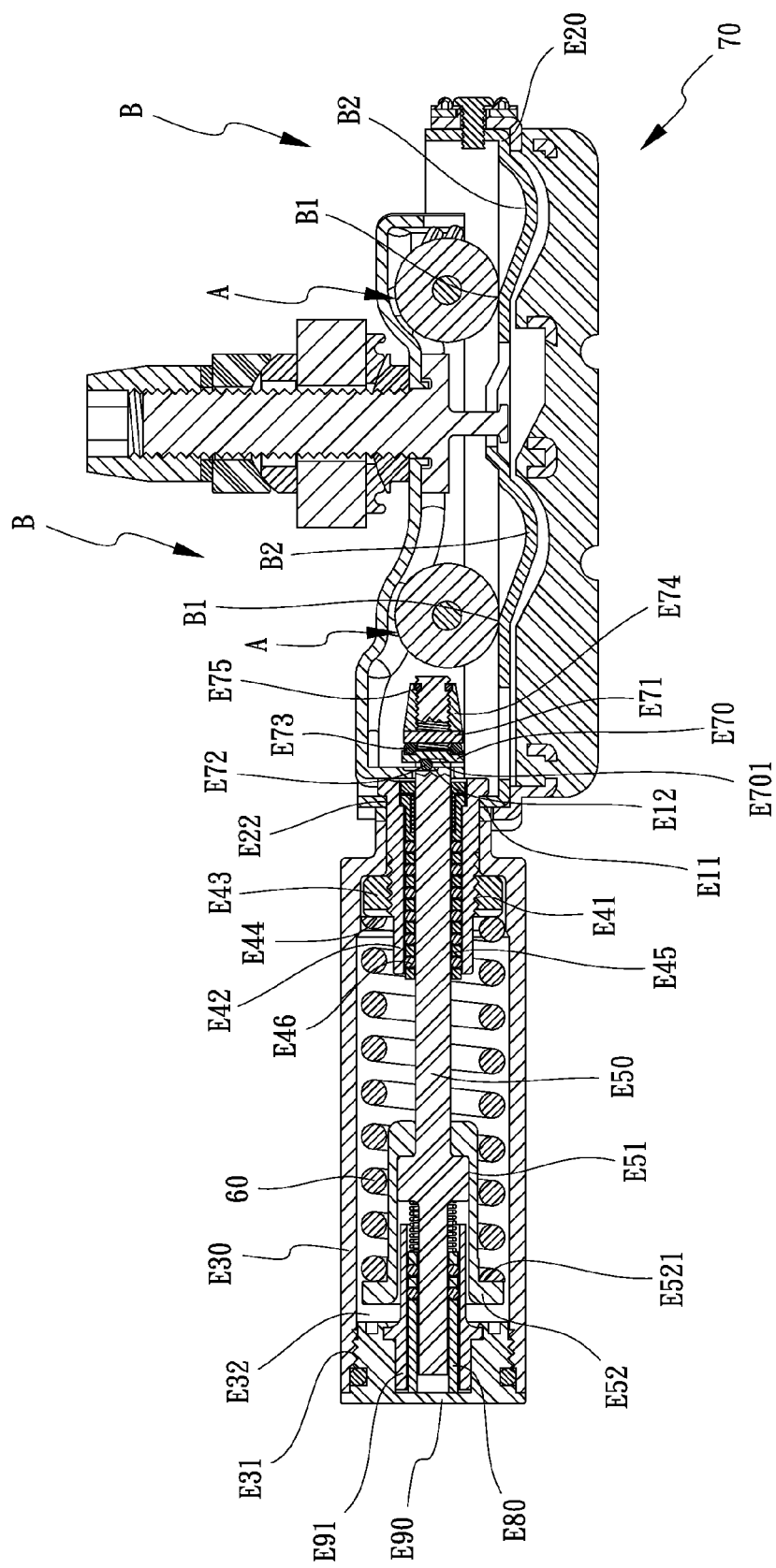
FIG. 17 is an operational and cross-sectional view of the fourth embodiment of the anti-lock brake structure in accordance with the present invention when each wheel set is rolled into the shallow section of the corresponding anti-lock inclined surface.

As shown in FIGS. 15-16, the brake shoe 70 and the slidable holder E20 would slide relative to the brake base E10 by the inertial force of the vehicle. The elastic member 60 is axially compressed by the movement of the fixing nut E43 which is driven by the seat member E30. The positioning sleeve E40 axially moves relative to the positioning shaft E50. Each wheel set A simultaneously rolls from the shallow section B1 to the deeper section B2 of the corresponding anti-lock inclined surface B of the slidable holder E20. As shown in FIG. 17, each wheel set A simultaneously rolls from the deeper section B2 to the shallow section B1 of the corresponding anti-lock inclined surface B of the slidable holder E20.

Accordingly, when braking, the first end of the positioning shaft E50 moves relative to the brake base E10. The two assisting members E72 correspondingly and rollably move along the two elongated grooves E12 of the brake base E10 and the two elongated channels E701 of the first washer E70. The first washer E70 oscillatingly abuts against the second washer E71 via the two abutting members E73.

Figure 18:
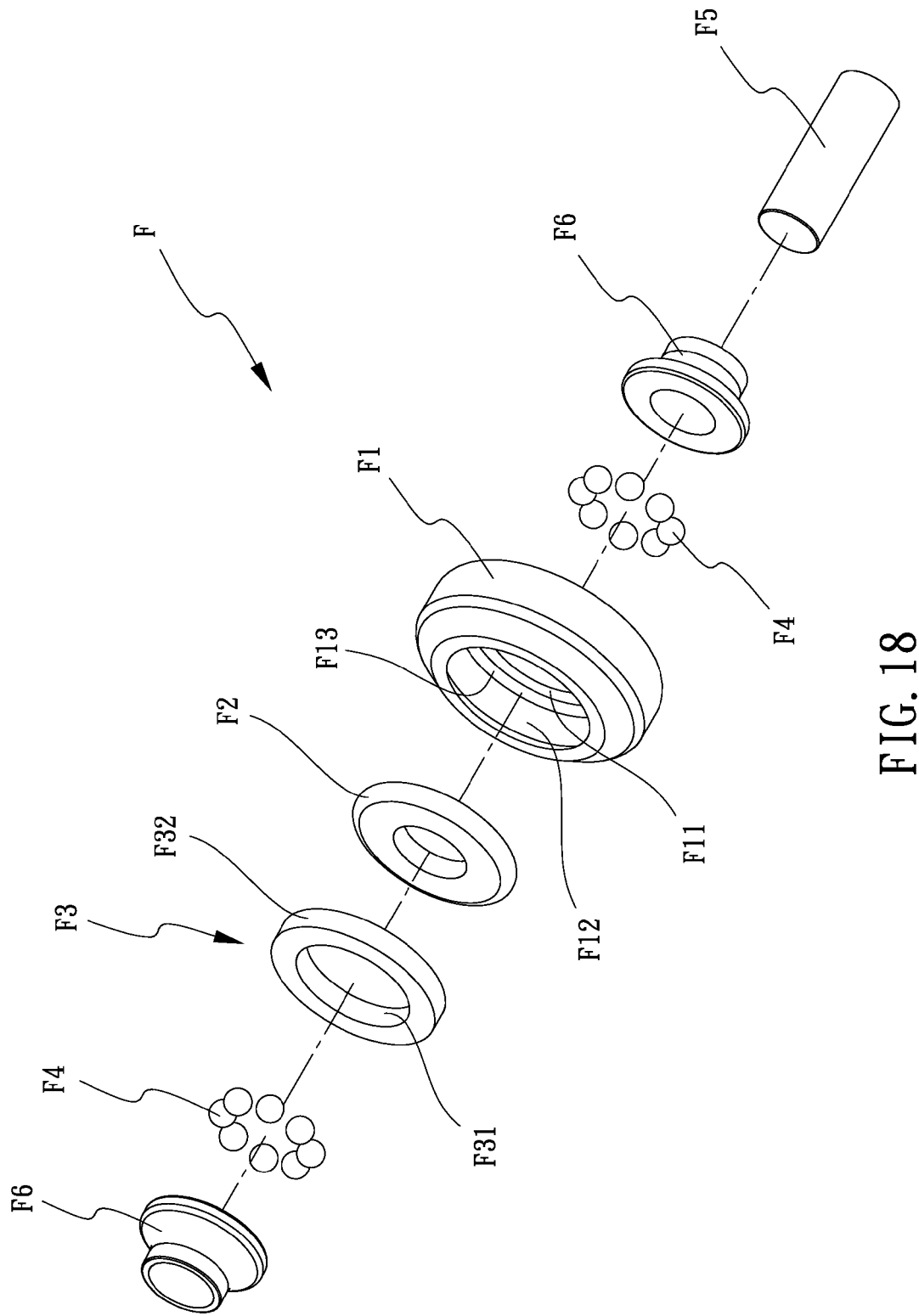
FIG. 18 is an exploded perspective view of a wheel set and a fixing shaft of a fifth embodiment of the anti-lock brake structure in accordance with the present invention.
Figure 20:
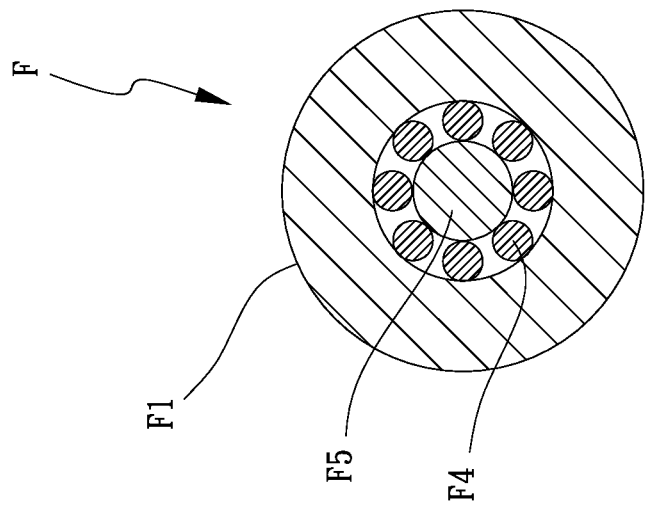
FIG. 20 is an assembled and cross-sectional front view of the wheel set and the fixing shaft of the fifth embodiment of the anti-lock brake structure in accordance with the present invention.
Figure 19:
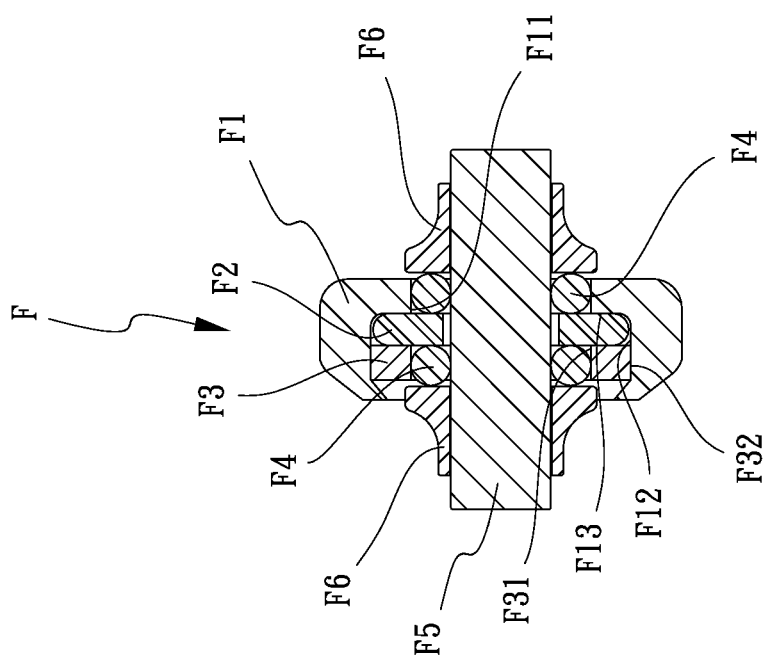
FIG. 19 is an assembled and cross-sectional side view of the wheel set and the fixing shaft of the fifth embodiment of the anti-lock brake structure in accordance with the present invention.

With reference to FIGS. 18-20, those show a fifth embodiment of the anti-lock brake structure in accordance with the present invention. The elements and effects of the second embodiment which are the same with the preferred embodiment are not described, only the differences are described. In this embodiment, each wheel set F comprises a first wheel F1, a second wheel F3, and a washer F2 coaxially sleeving on the corresponding fixing shaft F5. An inner periphery of the first wheel F1 has a friction portion F11 annularly formed thereon and a positioning groove F12 annularly defined therein. A locating portion F13 is formed on the inner periphery of the first wheel F1 and located between the friction portion F11 and the positioning groove F12.

A plurality of rollable members F4 movably abut against between the friction portion F11 of the first wheel F1 and an outer periphery of the corresponding fixing shaft F5. The second wheel F3 and the washer F2 are positioned and received in the positioning groove F12 of the first wheel F1. The second wheel F3 has a friction inner periphery F31 and a positioning outer periphery F32. A plurality of rollable members F4 are disposed between the friction inner periphery F31 of the second wheel F3 and the outer periphery of the corresponding fixing shaft F5. The rollable members F4 which are disposed on the friction portion F11 of the first wheel F1 and the rollable members F4 which are disposed on the friction inner periphery F31 of the second wheel F3 are separated by the washer F2.

When each first wheel F1 rivetedly receives the rollable members F4, the washer 2, and the second wheel F3, two opening ends of each first wheel F1 would be narrowed for preventing the second wheel F3 from falling out. Each fixing shaft F5 has two lining sleeves F6 respectively and coaxially disposed on two ends thereof for preventing the rollable members F4 from falling out.

Figure 21:
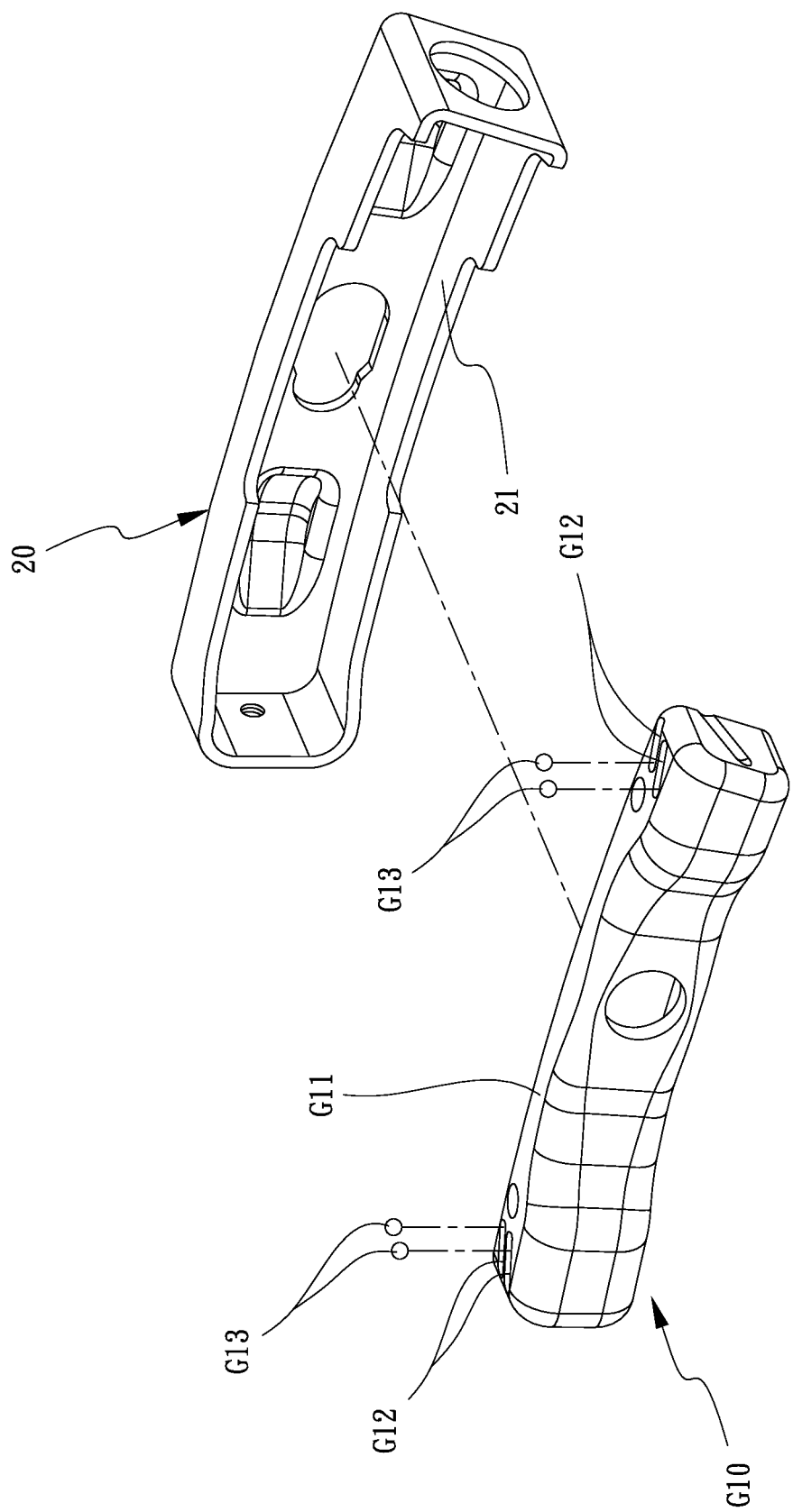
FIG. 21 is an exploded perspective view of a brake base and a slidable holder of a sixth embodiment of the anti-lock brake structure in accordance with the present invention.
Figure 22:
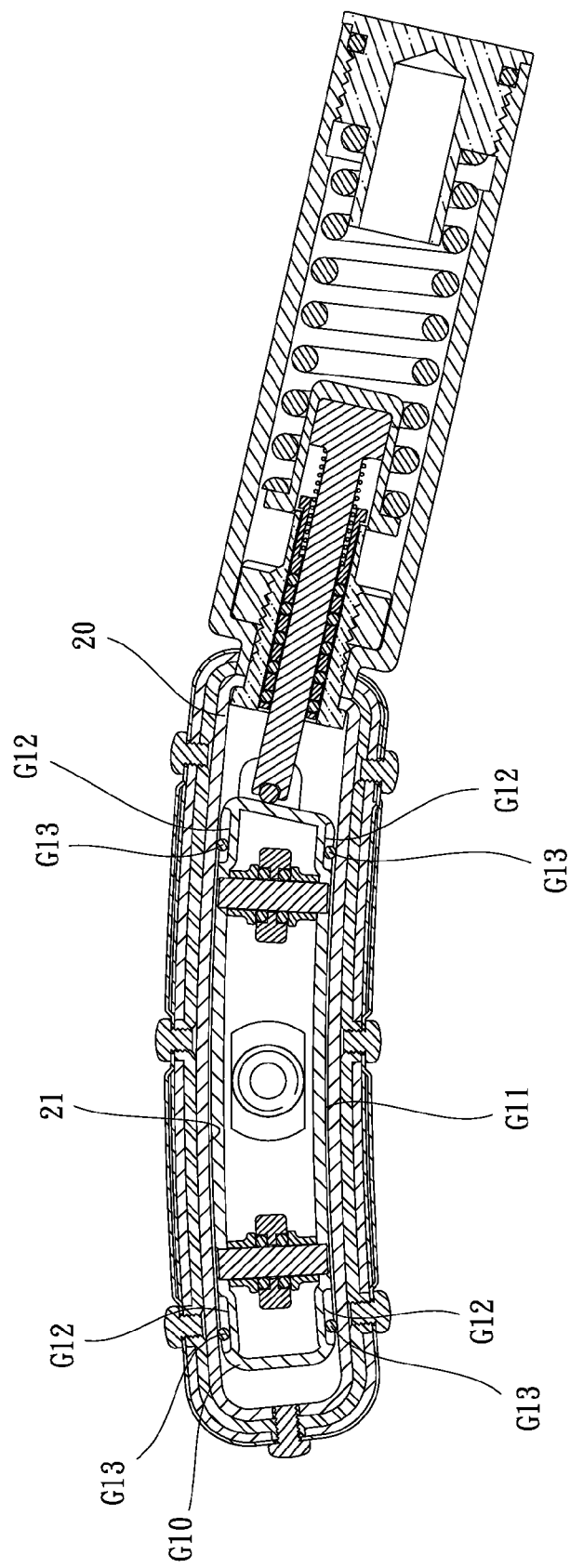
FIGS. 22-23 are operational and cross-sectional front views of the sixth embodiment of the anti-lock brake structure in accordance with the present invention.
Figure 23:
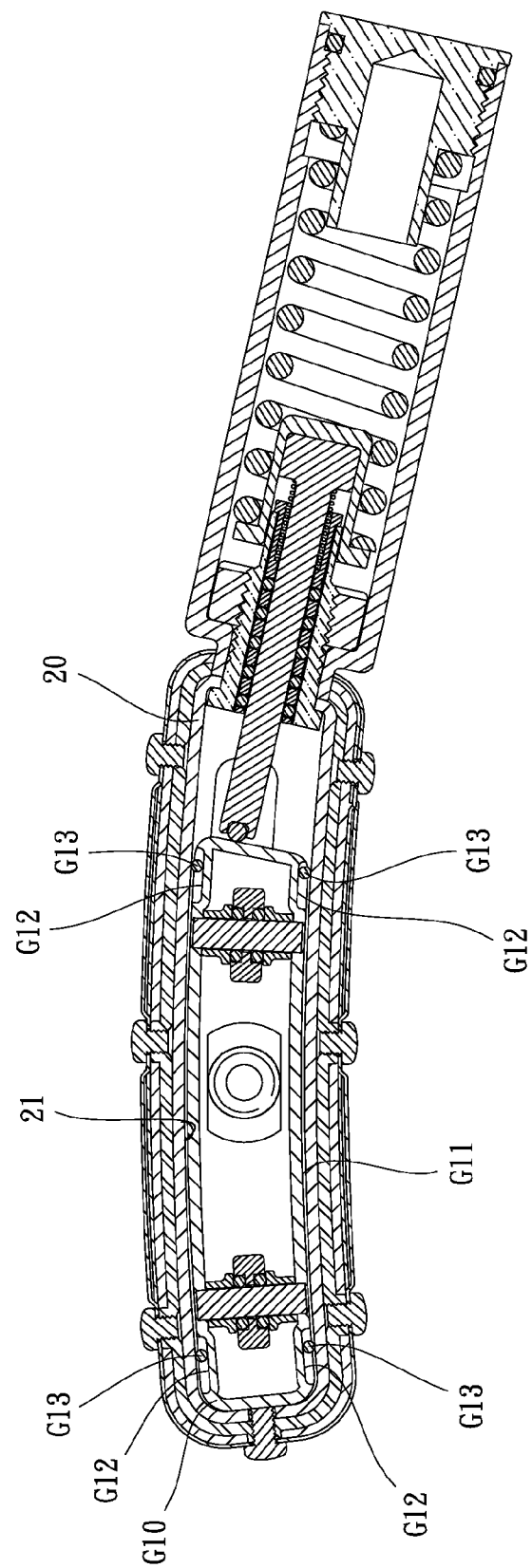
Figure 24:
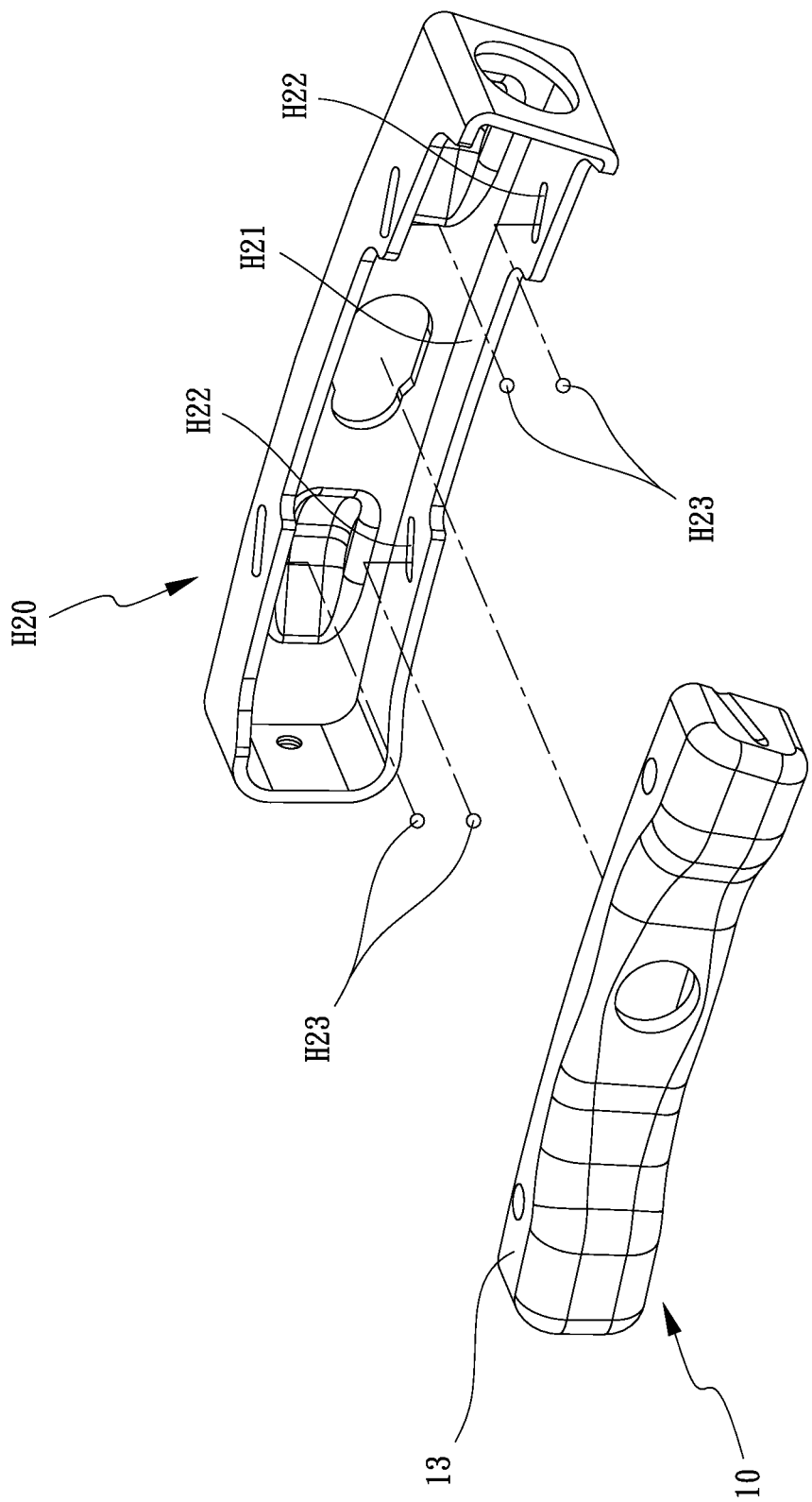
FIG. 24 is an exploded perspective view of a brake base and a slidable holder of a seventh embodiment of the anti-lock brake structure in accordance with the present invention.
Figure 25:
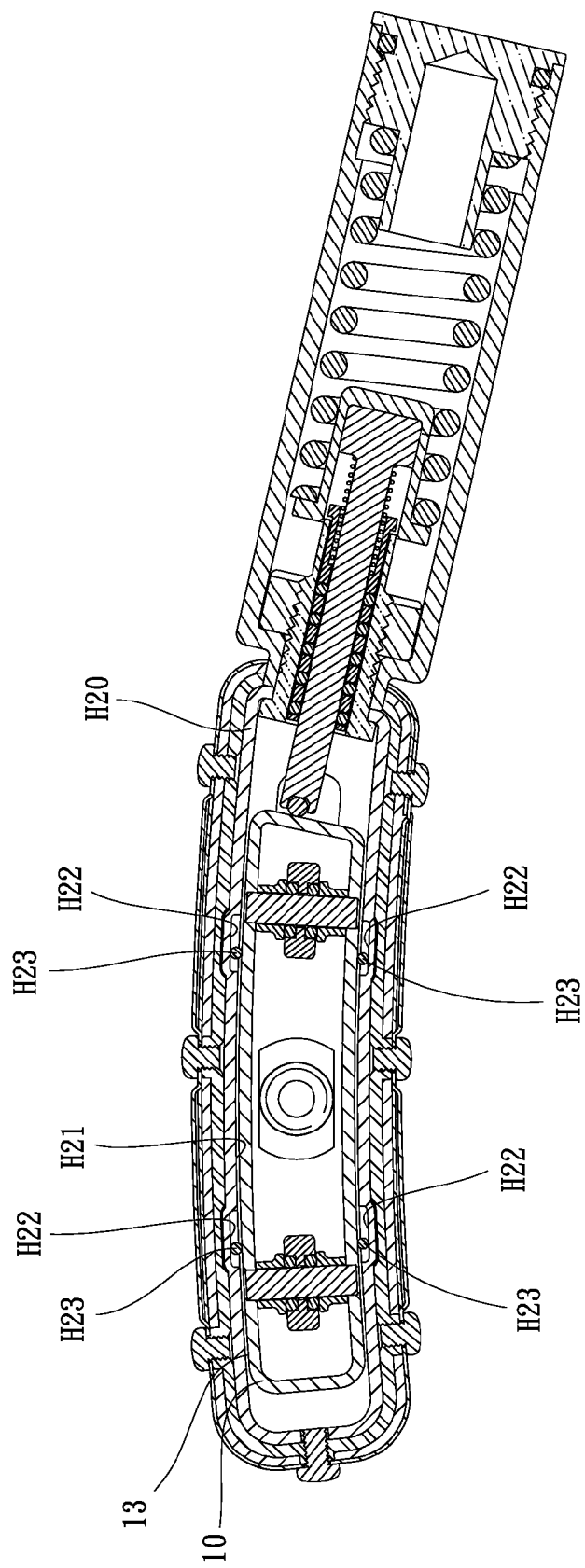
FIGS. 25-26 are operational and cross-sectional front views of the seventh embodiment of the anti-lock brake structure in accordance with the present invention.
Figure 26:
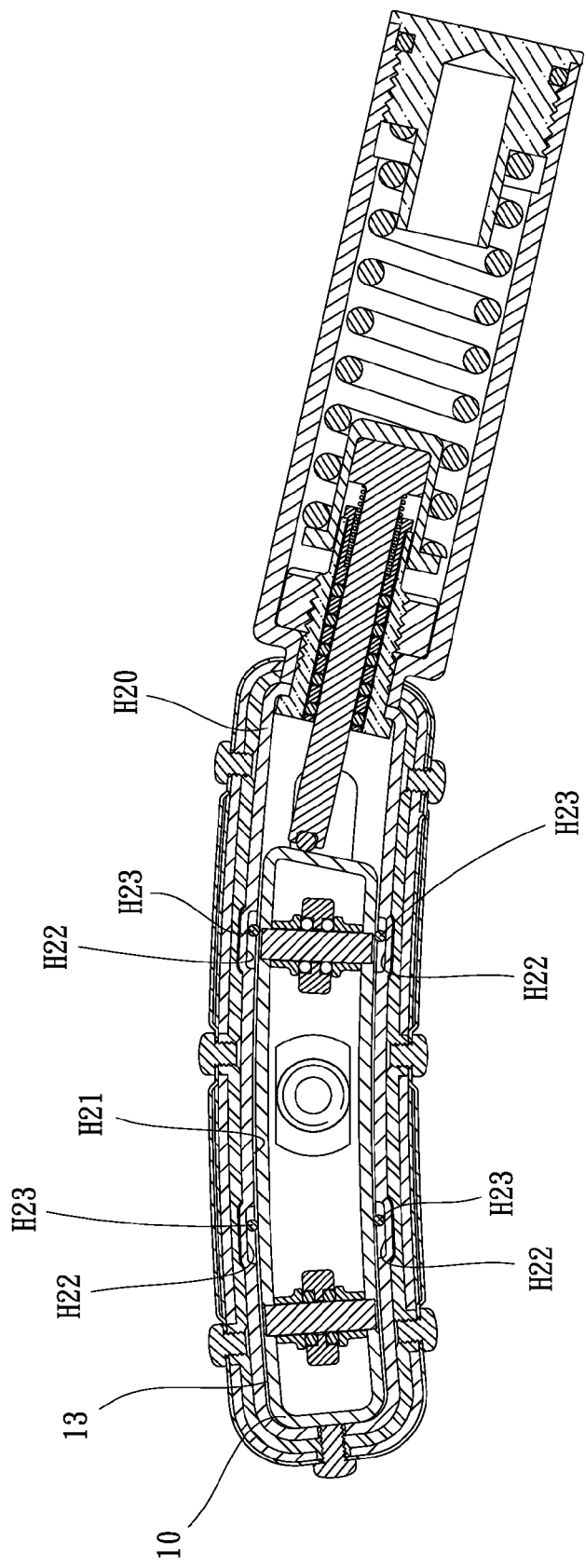

With reference to FIGS. 21-23, those show a sixth embodiment of the anti-lock brake structure in accordance with the present invention. The elements and effects of the second embodiment which are the same with the preferred embodiment are not described, only the differences are described. In this embodiment, the curved guiding portion G11 of the brake base G10 has at least one elongated slot G12 laterally formed on two ends thereof. At least one rolling member G13 is correspondingly and rollably received in the at least one elongated slot G12 of the curved guiding portion G11 of the brake base G10. The at least one rolling member G13 correspondingly abuts against between the at least one elongated slot G12 and an inner periphery of the curved guiding groove 21 of the slidable holder 20, such that the slidable holder 20 smoothly slides relative to the brake base G10 via the at least one rolling member G13.

With reference to FIGS. 21-23, those show a seventh embodiment of the anti-lock brake structure in accordance with the present invention. The elements and effects of the second embodiment which are the same with the preferred embodiment are not described, only the differences are described. In this embodiment, the slidable holder H20 has at least one elongated slot H22 defined in an inner periphery of the curved guiding groove H21. At least one rolling member H23 is correspondingly disposed in the at least one elongated slot H22. The at least one rolling member H23 correspondingly abuts against between the at least one elongated slot H22 and an outer periphery of the curved guiding portion 13 of the brake base 10, such that the slidable holder H20 smoothly slides relative to the brake base 10 via the at least one rolling member H23.

Figure 27:
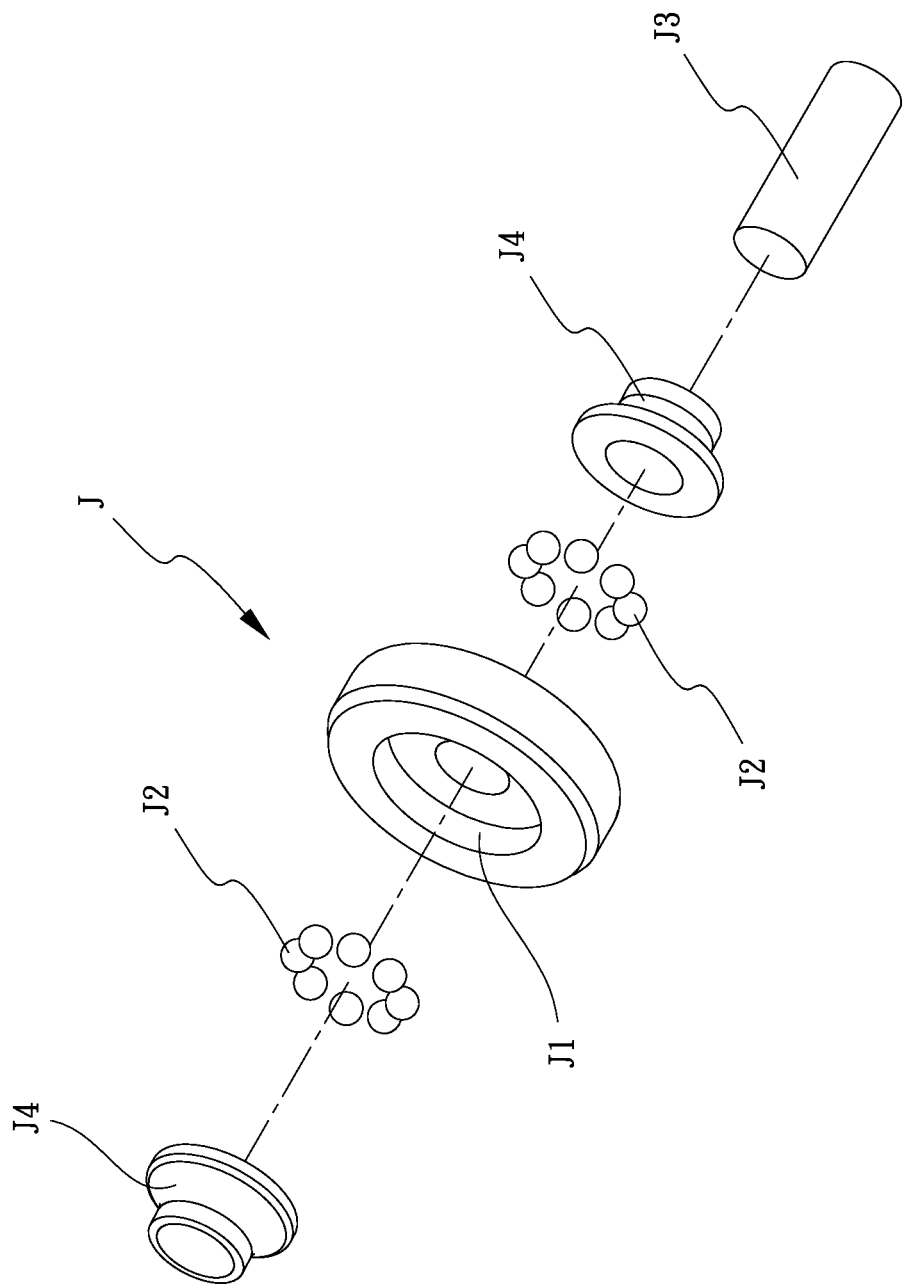
FIG. 27 is an exploded perspective view of a wheel set and a fixing shaft of a eighth embodiment of the anti-lock brake structure in accordance with the present invention.
Figure 29:
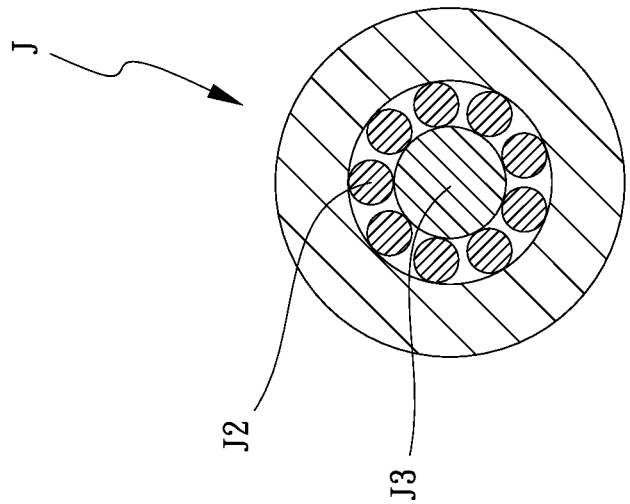
FIG. 29 is an assembled and cross-sectional front view of the wheel set and the fixing shaft of the eighth embodiment of the anti-lock brake structure in accordance with the present invention.
Figure 28:
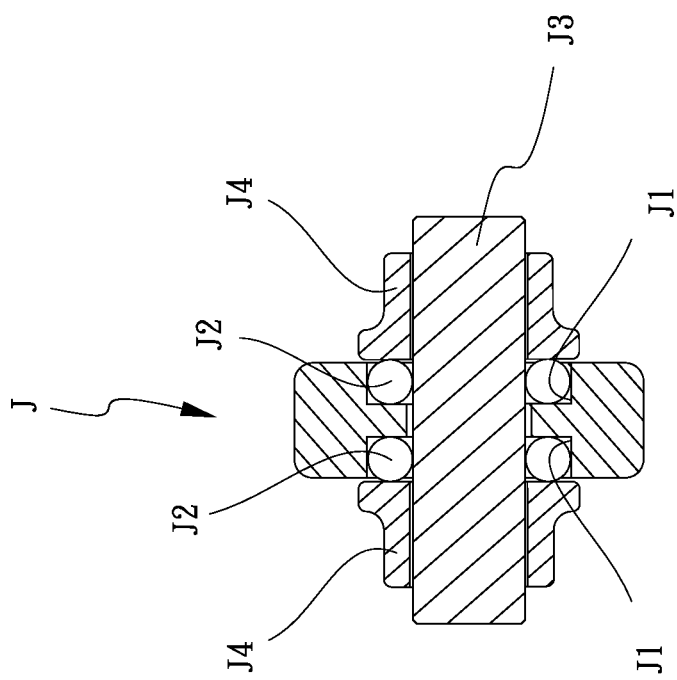
FIG. 28 is an assembled and cross-sectional side view of the wheel set and the fixing shaft of the eighth embodiment of the anti-lock brake structure in accordance with the present invention.

With reference to FIGS. 27-29, those show an eighth embodiment of the anti-lock brake structure in accordance with the present invention. The elements and effects of the second embodiment which are the same with the preferred embodiment are not described, only the differences are described. In this embodiment, each of the two wheel sets J has two friction portions J1 respectively formed on two ends of an inner periphery thereof. A plurality of rollable members J2 are rollably disposed between each friction portion J1 of the wheel set J and an outer periphery of the corresponding fixing shaft J3. Each fixing shaft J3 has two lining sleeves J4 respectively and coaxially disposed on two ends thereof for preventing the rollable members J2 from falling out.

Although the invention has been explained in relation to its preferred embodiment, it is to be understood that many other possible modifications and variations can be made without departing from the spirit and scope of the invention as hereinafter claimed.

What is claimed is:

1. An anti-lock brake structure adapted to be disposed on a wheel rim of a vehicle, the anti-lock brake structure comprising:
    a brake base having a curved guiding portion longitudinally formed on a lateral side of the brake base;
    a slidable holder movably receiving the brake base, the slidable holder having a curved guiding groove defined therein, the curved guiding groove corresponding to the curved guiding portion of the brake base for receiving the brake base;
    two anti-lock inclined surfaces positioned between the curved guiding portion of the brake base and the curved guiding groove of the slidable holder, each anti-lock surface having a shallow section and a deeper section located adjacent to the shallow section, the shallow section gradually sloping toward the deeper section along a rotating direction of the wheel rim;
    two wheel sets disposed between the curved guiding portion of the brake base and the curved guiding groove of the slidable holder, the two wheel sets respectively and movably abutting against the two anti-lock inclined surfaces, wherein when the slidable holder moves relative to the brake base, each wheel rolls and reciprocates between the shallow section and the deeper section;
    a seat member connected to the slidable holder and having a receiving space defined therein;
    a positioning sleeve connected the seat member with the slidable holder, the positioning sleeve having a positioning hole defined therein, an assisting sleeve coaxially and movably received in the positioning hole, the assisting sleeve having a plurality of apertures defined in an outer periphery thereof, an assisting member disposed in each aperture, a positioning shaft coaxially and slidably received in the assisting sleeve, wherein when the positioning sleeve moves relative to the positioning shaft, the positioning shaft simultaneously drives the assisting members to roll and the assisting sleeve is driven to move by the assisting members;
    an elastic member compressibly received in the receiving space of the seat member to adapt to provide a biasing force on the slidable holder; and
    a brake shoe connected to the slidable holder for adapting to pressing against the wheel rim of the vehicle.

2. The anti-lock brake structure as claimed in claim 1, wherein the curved guiding portion of the brake base has two bores respectively defined in two ends thereof, a fixing shaft passing through each of the two bores, the two wheel sets respectively and rollably sleeving on the two fixing shafts;
    the two anti-lock surfaces formed on a bottom of the curved guiding groove of the slidable holder, each anti-lock surface corresponding to a location of each wheel set, the shallow section gradually sloping toward the deeper section along the rotating direction of the wheel rim;
    wherein when the slidable holder moves relative to the brake base, each wheel set rolls and reciprocates between the shallow section and the deeper section.

3. The anti-lock brake structure as claimed in claim 1, wherein the curved guiding groove of the slidable holder has two bores respectively defined in two ends thereof, a fixing shaft passing through each of the two bores, the two wheel sets respectively and rollably sleeving on the two fixing shafts;
    the two anti-lock surfaces formed on the curved guiding portion of the brake base, each anti-lock surface corresponding to a location of each wheel set, the shallow section gradually sloping toward the deeper section along the rotating direction of the wheel rim;
    wherein when the slidable holder moves relative to the brake base, each wheel set rolls and reciprocates between the shallow section and the deeper section.

4. The anti-lock brake structure as claimed in claim 1, wherein the two wheel sets respectively sleeves on two fixing shafts, each wheel set having a friction portion annularly formed on an inner periphery thereof, a plurality of rollable members movably abutting against and between the friction portion of each wheel and an outer periphery of each fixing shaft.

5. The anti-lock brake structure as claimed in claim 4, wherein each wheel set comprises a first wheel, a second wheel, and a washer coaxially sleeving on the corresponding fixing shaft, an inner periphery of the first wheel having the friction portion formed thereon and a positioning groove annularly defined therein, the rollable members movably abutting against the friction portion of the first wheel;
    the second wheel and the washer positioned and received in the positioning groove of the first wheel, the second wheel having a friction inner periphery and a positioning outer periphery, a plurality of rollable members disposed between the friction inner periphery of each second wheel and the outer periphery of each fixing shaft.

6. The anti-lock brake structure as claimed in claim 1 further comprising at least one elongated slot positioned between the curved guiding portion of the brake base and the curved guiding groove of the slidable holder, at least one rolling member correspondingly and rollably received in the at least one elongated slot.

7. The anti-lock brake structure as claimed in claim 1, wherein the slidable holder has a positioning surface formed thereon, the brake shoe including a brake pad and a mounting seat connected to the brake pad, the brake shoe having a curved recess longitudinally defined in the mounting seat and corresponding to the slidable holder for receiving the slidable holder, the curved recess having a connecting surface formed thereon for correspondingly engaging with the positioning surface of the slidable holder.

\* \* \* \* \*